US007690414B2

(12) United States Patent
Knowles

(10) Patent No.: US 7,690,414 B2
(45) Date of Patent: Apr. 6, 2010

(54) MOTORIZED WINDOW SHADE

(75) Inventor: Byron R. Knowles, Boynton Beach, FL (US)

(73) Assignee: Aerospace Technologies Group, Inc., Boynton Beach, FL (US)

(*) Notice: Subject to any disclaimer, the term of this patent is extended or adjusted under 35 U.S.C. 154(b) by 390 days.

(21) Appl. No.: 11/645,981

(22) Filed: Dec. 26, 2006

(65) Prior Publication Data
US 2008/0148638 A1 Jun. 26, 2008

(51) Int. Cl.
E06B 3/32 (2006.01)
E06B 9/06 (2006.01)
E06B 9/32 (2006.01)

(52) U.S. Cl. .................. 160/90; 160/98; 160/84.02; 160/168.1 P

(58) Field of Classification Search .................. 160/89, 160/90, 98, 26, 33, 84.02, 84.06, 310, 168.1 P, 160/172 R, 265, 267.1
See application file for complete search history.

(56) References Cited

U.S. PATENT DOCUMENTS

| 2,647,572 | A | * | 8/1953 | Biscoe et al. | 160/115 |
|---|---|---|---|---|---|
| 3,186,473 | A | * | 6/1965 | Myers et al. | 160/26 |
| 3,568,751 | A | * | 3/1971 | Takahashi | 160/238 |
| 4,807,686 | A | | 2/1989 | Schnebly et al. | |
| 4,998,576 | A | * | 3/1991 | Moreno | 160/90 |
| 5,035,091 | A | * | 7/1991 | Ebato | 52/1 |
| 5,082,043 | A | * | 1/1992 | Moreno | 160/90 |
| 5,195,569 | A | * | 3/1993 | Peterson et al. | 160/84.06 |
| 5,515,898 | A | * | 5/1996 | Alcocer | 160/84.02 |
| 6,035,917 | A | * | 3/2000 | Cohen-Ravid | 160/35 |
| 6,186,211 | B1 | * | 2/2001 | Knowles | 160/84.02 |
| 6,230,784 | B1 | * | 5/2001 | Sanz et al. | 160/84.02 |
| 6,460,805 | B1 | * | 10/2002 | Sanz et al. | 244/129.3 |
| 6,481,486 | B1 | * | 11/2002 | Sanz et al. | 160/84.06 |
| 6,530,414 | B2 | * | 3/2003 | Mayr et al. | 160/98 |
| 6,745,810 | B1 | * | 6/2004 | Moreno et al. | 160/97 |
| 6,832,641 | B1 | * | 12/2004 | Sanz et al. | 160/90 |
| 6,915,988 | B2 | * | 7/2005 | Sanz et al. | 244/129.3 |
| 7,234,501 | B1 | * | 6/2007 | Park | 160/107 |
| 7,481,260 | B2 | * | 1/2009 | Hagen | 160/265 |
| 2001/0011580 | A1 | * | 8/2001 | Knowles | 160/84.02 |
| 2002/0053410 | A1 | * | 5/2002 | Mayr et al. | 160/98 |
| 2003/0085001 | A1 | * | 5/2003 | Sanz et al. | 160/84.04 |
| 2004/0040672 | A1 | * | 3/2004 | Nagar | 160/98 |
| 2005/0263254 | A1 | * | 12/2005 | Sievers et al. | 160/90 |

FOREIGN PATENT DOCUMENTS

| DE | 202 09 724 | | 12/2002 |
|---|---|---|---|
| EP | 1273754 | * | 8/2003 |
| EP | 1 674 650 | | 6/2006 |

* cited by examiner

Primary Examiner—Katherine W Mitchell
Assistant Examiner—Jaime F Cardenas-Garcia
(74) Attorney, Agent, or Firm—Cohen Pontani Lieberman & Pavane LLP

(57) ABSTRACT

A window assembly that includes a motorized window shade mechanism. The window assembly includes two reversible motors that are disposed in, and at the top of, the window assembly. The window assembly further includes an opaque shade and a translucent shade. Each shade is independently raised and lowered with the motors by a separate gear and belt system positioned at the sidewalls of the window assembly, which are coupled to each other by rotatable shafts journalled into the bottom of the window. Each gear and belt system is driven by one of the reversible motors.

26 Claims, 21 Drawing Sheets

MOTORIZED WINDOW SHADE

TECHNICAL FIELD

The invention relates generally to a motorized window shade and is disclosed in connection with a motorized window shade mechanism adapted for use in windows of multi-passenger vehicles, such as an airplane.

BACKGROUND INFORMATION

Various window shade mechanisms specifically adapted for aircraft windows have been previously presented. One such shade mechanism utilizes cables and pulleys. See U.S. Pat. No. 5,082,043. A slidable actuator must be manually moved to operate the window shade. Manual operation is inconvenient. Also, during flight it is advantageous to have the capability of operating all the window shades on an aircraft simultaneously by one person. However, this is not possible with manually-operated window shades. Further, various parts of the shade mechanism are particularly vulnerable to malfunction. Moreover, many components are required, which reduces reliability and increases the cost of producing the shade mechanism.

Another shade mechanism involves a motor that is fixed inside the window and operates the shade with cables and pulleys. See U.S. Pat. Nos. 5,515,898 and 4,998,576. This mechanism also requires numerous components, which can only be manufactured, assembled, and installed at considerable cost. Further, because of the numerous parts, the reliability of the design is questionable.

Still another shade mechanism involves a motor attached to a lower bar or rail of a shade. The motor moves along with the shade as the shade is extended and retracted. See U.S. Pat. No. 4,807,686. However, this shade mechanism also utilizes numerous components, which increases the cost of production and reduces the reliability of operation.

A further shortcoming of at least some of the above-mentioned designs is too much bulk and weight. The space available in an aircraft window within which the entire window shade assembly must fit is quite restricted. Also, reduction of weight is of particularly high importance in an aircraft environment.

U.S. Pat. No. 6,186,211 discloses a motorized window shade assembly for operating a window shade having a rail attached to one end of the shade to extend and compress the shade with movement of the rail. The motorized window shade assembly includes a shell having two sidewalls, and a rail extending between the two sidewalls of the shell. The sidewalls have respective opposed inner surfaces with a channel therein, shoulders adjacent and perpendicular to the inner surfaces, respectively, and a traction surface on each of the shoulders. An axle is rotatingly coupled to the rail and has a traction wheel coupled to each end thereof. Opposite tips of the axle ride within the channels in the sidewalls, and the traction wheels engage the traction surface. A motor is attached to the rail and is drivingly coupled to the axle. Although this is a useful and effective arrangement, its size does not readily fit within the space limitations available in windows used on many commercial airliners. Thus, it became necessary to devise a motorized window shade assembly with the advantages of this configuration, but with smaller stack height (the extent to which the shade is compressed when fully retracted), width and thickness.

SUMMARY OF THE INVENTION

One object of the present invention is to provide an improved motorized window shade mechanism.

Another object of the present invention is to provide a motorized window shade mechanism that can be of a size small enough to suitably fit within the restricted space available in windows used on aircraft.

These and other objects are attained in accordance with one aspect of the present invention directed to a motorized mechanism for operating a window shade, the window shade including a fixed end and a free end movable between a retracted position and an extended position. The mechanism comprises motorized rotational motion generating means, disposed proximate to the fixed end of the window shade, for generating rotational motion. First converting means converts the rotational motion of the rotational motion generating means to linear motion between the retracted position and the extended position. Second converting means converts the linear motion of the first converting means to rotational motion. Third converting means converts the rotational motion of the second converting means to linear motion between the retracted position and the extended position. Means is provided for coupling the free end of the window shade to the first and third converting means so that the window shade is operated with operation of the rotational motion generating means to move the free end of the window shade between the retracted position and the extended position.

Another aspect of the present invention is directed to a motorized mechanism for operating a window shade in relation to a window secured in a shell having a first end and a second end, and a first side wall and a second sidewall, the first and second sidewalls extending between the first and second ends. The window shade includes a fixed end, secured proximate to the first end of the shell, and a free end that is movable between the first and second ends of the shell from a retracted position at the first end where the passage of light through the window is unobstructed, and an extended position at the second end where the passage of light through the window is obstructed. The motorized mechanism comprises a motor secured proximate to the fixed end of the window shade, and a rotatable shaft comprising a first end and a second end, the rotatable shaft being rotatably secured at the second end of the shell and disposed between the first and second sidewalls. Rotation coupling means extends along the first sidewall between the reversible motor and the first end of the rotatable shaft to drive the rotatable shaft with operation of the reversible motor. First traversing means is coupled to the rotation coupling means for moving along the first sidewall between the first and second ends of the shell as the rotation coupling means drives the rotatable shaft with operation of the reversible motor. Driven means extends along the second sidewall and is drivingly coupled to the second end of the rotatable shaft. Second traversing means is coupled to the driven means for moving along the second sidewall between the first and second ends of the shell in conjunction with the first traversing means as the rotation coupling means drives the rotatable shaft with operation of the reversible motor. Means for connecting the free end of the window shade between the first and second traversing means is provided so that the window shade is operated with operation of the reversible motor.

Yet another aspect of the invention is directed to a window comprising a housing defining a first opening and a second opening, and comprising a first end, a second end, a first sidewall, and a second sidewall, the first and second sidewalls extending between the first end and the second end. A first window shade comprises a fixed end and a free end, the first window shade being disposed inside the housing, the fixed end extending between the first and second sidewalls and being fixed proximate to the first end of the housing, the free end extending between the first and second sidewalls and being movable along the first and second sidewalls between a retracted position, where the passage of light through the first and second openings is unobstructed by said first window shade, and an extended position, where the passage of light through the first and second openings is obstructed by said first window shade. A second window shade comprises a fixed end and a free end, the second window shade being disposed inside the housing, the fixed end extending between the first and second sidewalls and being fixed proximate to the first end of the housing, the free end extending between the first and second sidewalls and being movable along the first and second sidewalls between a retracted position, where the passage of light through the first and second openings is unobstructed by the second window shade, and an extended position, where the passage of light through the first and second openings is obstructed by the second window shade. A first motor is secured proximate to the first end of the housing. A second motor is secured proximate to the first end of the housing. A first rotation means is rotatably secured proximate to the first end of the housing. A second rotation means is rotatably secured proximate to the first end of the housing. A first rotatable shaft comprises a first end and a second end, the first rotatable shaft being rotatably secured proximate to the second end of the housing and disposed between the first and second sidewalls. A second rotatable shaft comprises a first end and a second end, the second rotatable shaft being rotatably secured proximate to the second end of the housing and disposed between the first and second sidewalls. First rotation coupling means extends along the first sidewall between the first motor and the first end of the second rotatable shaft to drive the second rotatable shaft in response to operation of the first motor. Second rotation coupling means extends along the second sidewall between the second end of the second rotatable shaft and the second rotation means to drive the second rotation means in response to operation of the first motor. Third rotation coupling means extends along the second sidewall between the second motor and the second end of the first rotatable shaft to drive the first rotatable shaft in response to operation of the second motor. Fourth rotation coupling means extends along the first sidewall between the second end of the first rotatable shaft and the first rotatable means to drive the first rotatable means in response to operation of the second motor. Means is provided for coupling the free end of the first window shade between the third and fourth rotation coupling means so that the first window shade is retracted or extended in response to operation of the second motor. Means is provided for coupling the free end of the second window shade between the first and second rotation coupling means so that the second window shade is retracted or extended in response to operation of the first motor.

Another aspect of the present invention is directed to a motorized mechanism for operating a window shade, the window shade including a fixed end and a free end movable in operation between a retracted position and an extended position. The mechanism comprises motorized rotational motion generating means, disposed proximate to the retracted position of the window shade, for generating rotational motion. First linear motion means extends along one side of the window shade and is responsive to the rotational motion of the rotational motion generating means to move linearly between the retracted position and the extended position. Rotating means, disposed proximate to the extended position, extends transversely of the window shade and is responsive to the linear motion of the first linear motion means at said one side of the window shade to produce rotational motion at the opposite side of the window shade. Second linear motion means extends along the opposite side of the window shade and is responsive to the rotational motion of the rotating means to move linearly between the retracted position and the extended position. Means is provided for coupling the free end of the window shade to the first and second linear motion means so that the window shade is operated with operation of the rotational motion generating means to move the free end of the window shade between the retracted position and the extended position.

Still another aspect of the present invention is directed to a motorized mechanism for operating a window shade, the window shade including a fixed end and a free end movable between a retracted position and an extended position. The mechanism comprises a motorized rotational motion generator, disposed proximate to the fixed end of the window shade. A first rotational-to-linear motion converter is coupled to said rotational motion generator. A linear-to-rotational motion converter is coupled to the first rotational-to-linear motion converter. A second rotational-to-linear motion converter coupled to said linear-to-rotational motion converter, wherein the free end of the window shade is coupled to the first and second rotational-to-linear motion converters, and whereby the window shade is operated with operation of the motorized rotational motion generator to move the free end of the window shade between the retracted position and the extended position.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF THE DRAWINGS

Although this invention is described herein in connection with its use in an aircraft environment, it should be understood that this is done only as an example of one possible usage. In fact, the invention can be used in any type of window installed in a home, office vehicle or other environment.

An airplane window assembly is disclosed that includes a motorized window shade mechanism. The window assembly includes an opaque shade and a translucent shade. The opaque shade provides total light blockage while the translucent shade allows a certain percentage of light to pass through. The window assembly further includes two reversible motors disposed at the top of the window assembly. Each shade is raised and lowered by a separate gear and belt system that is driven by one of the motors.

Figure 1A:
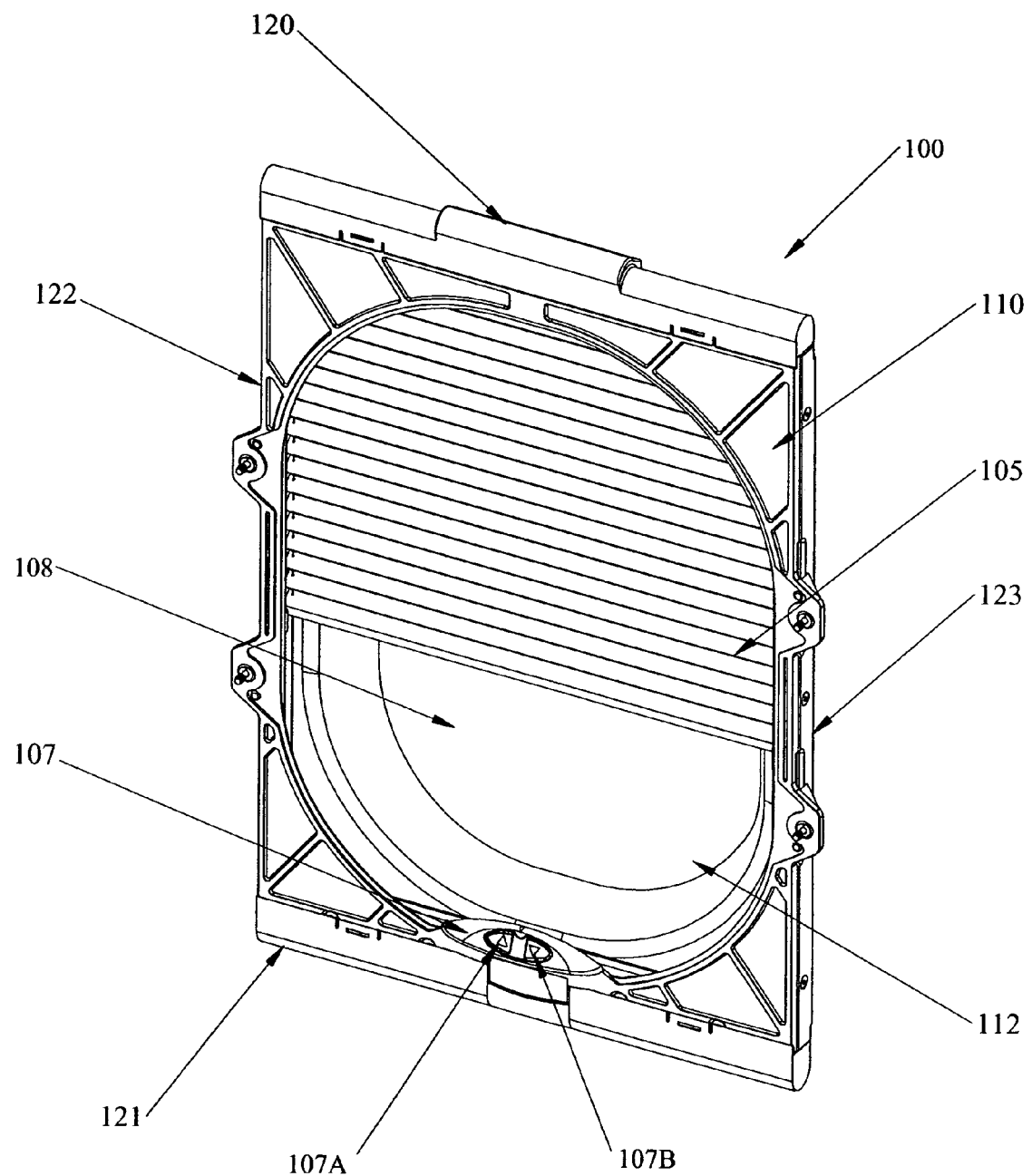
FIG. 1A is an illustrative perspective view of an inside face of an airplane window assembly, according to one embodiment of the invention.
Figure 1B:
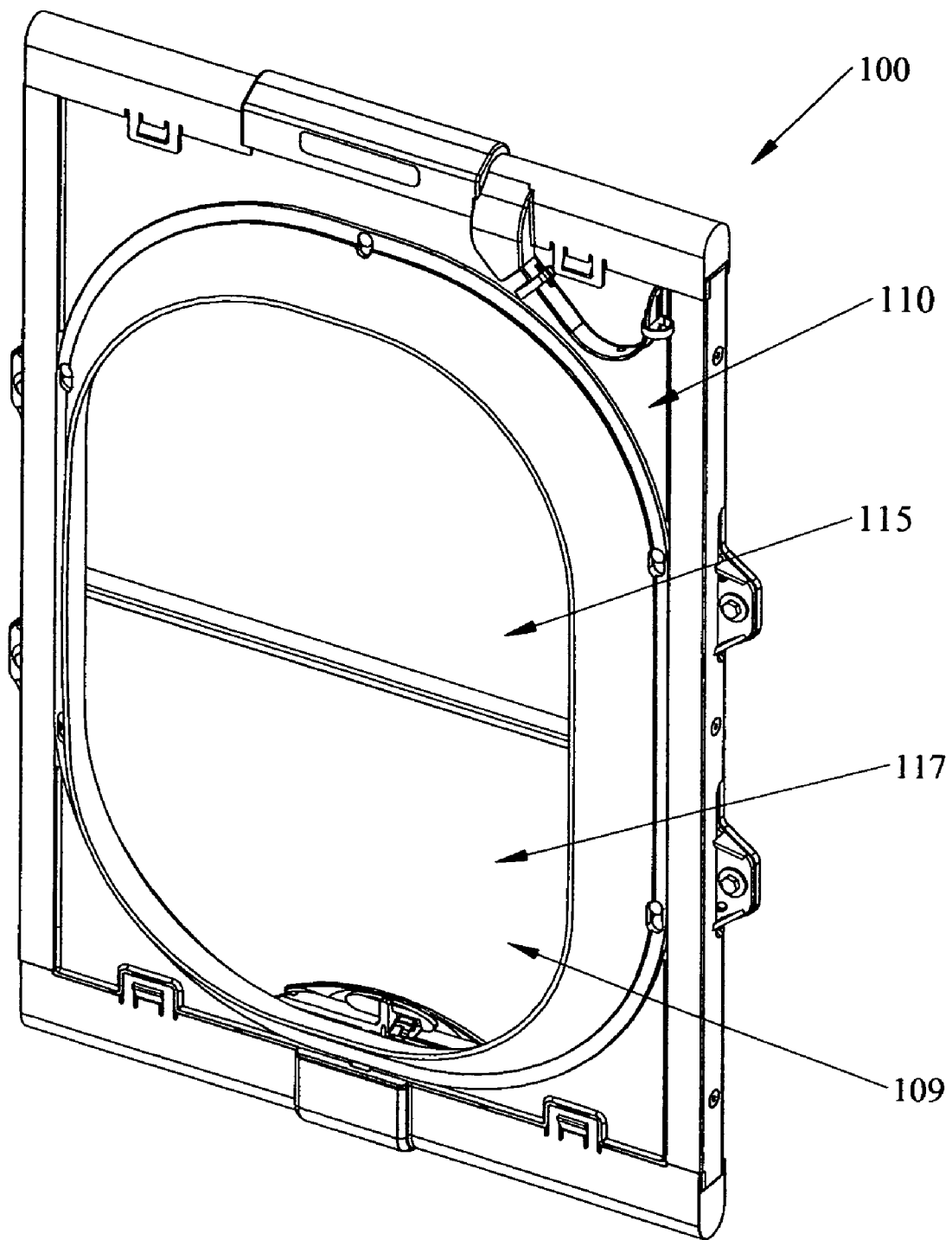
FIG. 1B is an illustrative perspective view of an outside face of the airplane window assembly of FIG. 1A.

Referring to an embodiment of the invention as shown in FIGS. 1A and 1B, illustrative perspective views of an inside face and an outside face of an airplane window assembly 100 are depicted. The window assembly 100 includes a shell (or housing) 110, which houses various electronic and mechanical components for enabling the window assembly to function, as described in detail below. The shell 110 defines an inside opening 108 and an outside opening 109 aligned therewith, and has a first (or top) end 120, a second (or bottom) end 121, a first (or left) sidewall 122, and a second (or right) sidewall 123. The window assembly 100 further includes an inside lens (i.e., a window pane) 112, an outside lens (i.e., a window pane) 117, a translucent shade 105, an opaque shade 115, and control buttons 107 (shade up button 107a, shade down button 107b).

The inside lens 112 is disposed inside the shell 110 and over the inside opening 108, and the outside lens 117 is disposed inside the shell 110 and over the outside opening 109. The translucent shade 105 is disposed inside the shell 110 and between the lenses 112, 117. The opaque shade 115 is disposed inside the shell 110 and between the outside lens 117 and the translucent shade 105.

In one embodiment, assuming that both the translucent shade 105 and the opaque shade 115 are in a retracted position such that light is allowed to pass unobstructed through the inner and outer lenses 112, 117, the window assembly 100 functions generally as described below.

A passenger wishing to reduce the light passing through the inner and outer lenses 112, 117 can lower, or extend, the translucent shade 105 to any desired position by pressing the shade-down button 107b disposed at the bottom of window assembly 100. While the passenger is holding down the button 107b, the translucent shade 105 extends downward between the inner lens 112 and the outer lens 117. If the passenger stops pressing the button 107b, the translucent shade 105 immediately stops extending. The passenger can use the shade-up button 107a to raise, or retract, the translucent shade 105. If the passenger continues pressing the shade down button 107b after the translucent shade 105 has been fully extended between the inner lens 112 and the outer lens 117, the opaque shade 115 begins to extend downward between the inner lens 112 and the outer lens 117, and behind the translucent shade 105. As with the translucent shade 105, the passenger can selectively position the opaque shade 115 with the up and down buttons 107a, 107b.

If both the translucent shade 105 and the opaque shade 115 are fully extended, all light is prevented from passing through the inner and outer lenses 112, 117. If the passenger wishes to raise the translucent and opaque shades 105, 115, the passenger need only press the shade-up button 107a. When the shade-up button 107a is pressed, the opaque shade 115 retracts first, leaving the translucent shade 105 fully extended. If the passenger continues to press the up button 107a after the opaque shade 115 has fully retracted, the translucent shade 105 starts to retract. The translucent shade 105 continues to retract until the passenger stops pressing the shade-up button 107a or the translucent shade 105 reaches a fully retracted position.

In another embodiment, a flight attendant or pilot can remotely override every passenger's positioning of their individual translucent and opaque shades 105, 115. For example, the flight attendant may choose to completely lower the translucent and opaque shades 105, 115 for all the windows during the viewing of an in-flight movie, or fully raise the translucent and opaque shades 105, 115 in preparation for landing.

In conjunction with FIGS. 2-10, the electronic and mechanical components disposed in the shell 110 that enable the window assembly 100 to function are described in detail hereinbelow.

Figure 2:
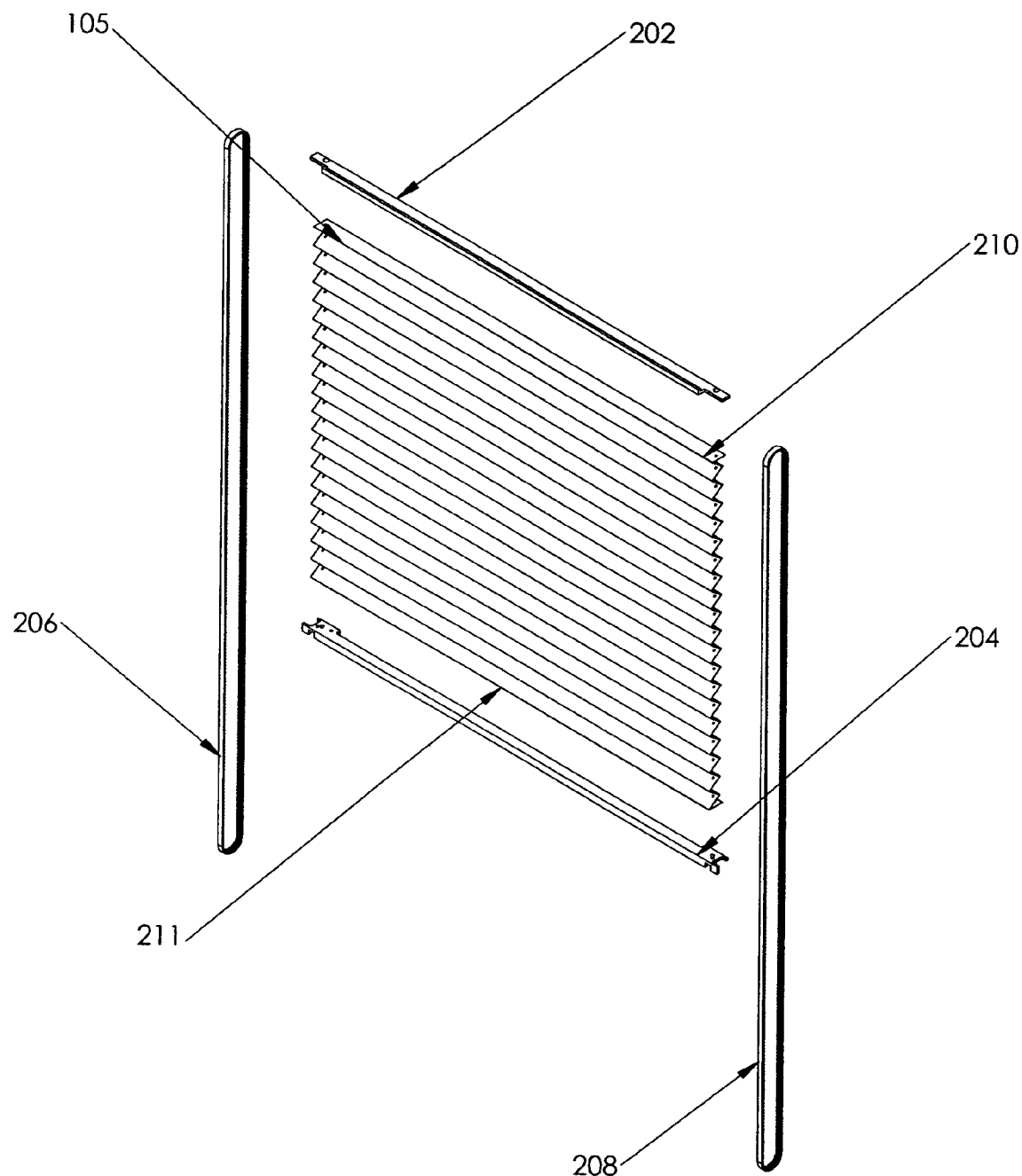
FIG. 2 is an illustrative perspective view of a translucent shade assembly, according to one embodiment of the invention.

Referring to FIG. 2, in one embodiment, an exploded perspective view of a translucent shade assembly is shown. The translucent shade assembly includes the translucent shade 105, a translucent shade upper support 202, a translucent shade lead assembly 204, a left translucent shade gear belt 206, and a right translucent shade gear belt 208. The translucent shade 105 includes a top or fixed end 210 and a bottom or free end 211. Gear belts 206, 208 are preferably timing belts which have protrusions extending radially which engage within recesses on the outer periphery of the gears.

The fixed end 210 is attached to the upper support 202, which is fixed at the top of shell 110 by having its ends secured to the first and second sidewalls 122, 123 (FIG. 1). The free end 211 is attached to the lead assembly 204, which extends horizontally between the first and second sidewalls 122, 123. The left translucent shade gear belt 206 extends vertically along the left sidewall 122, and the right translucent shade gear belt 208 extends vertically along the right sidewall 123. The lead assembly 204 is coupled to the left and right gear belts 206, 208 by left and right clips, which are discussed in further detail with respect to FIGS. 5A-5C.

Figure 3:
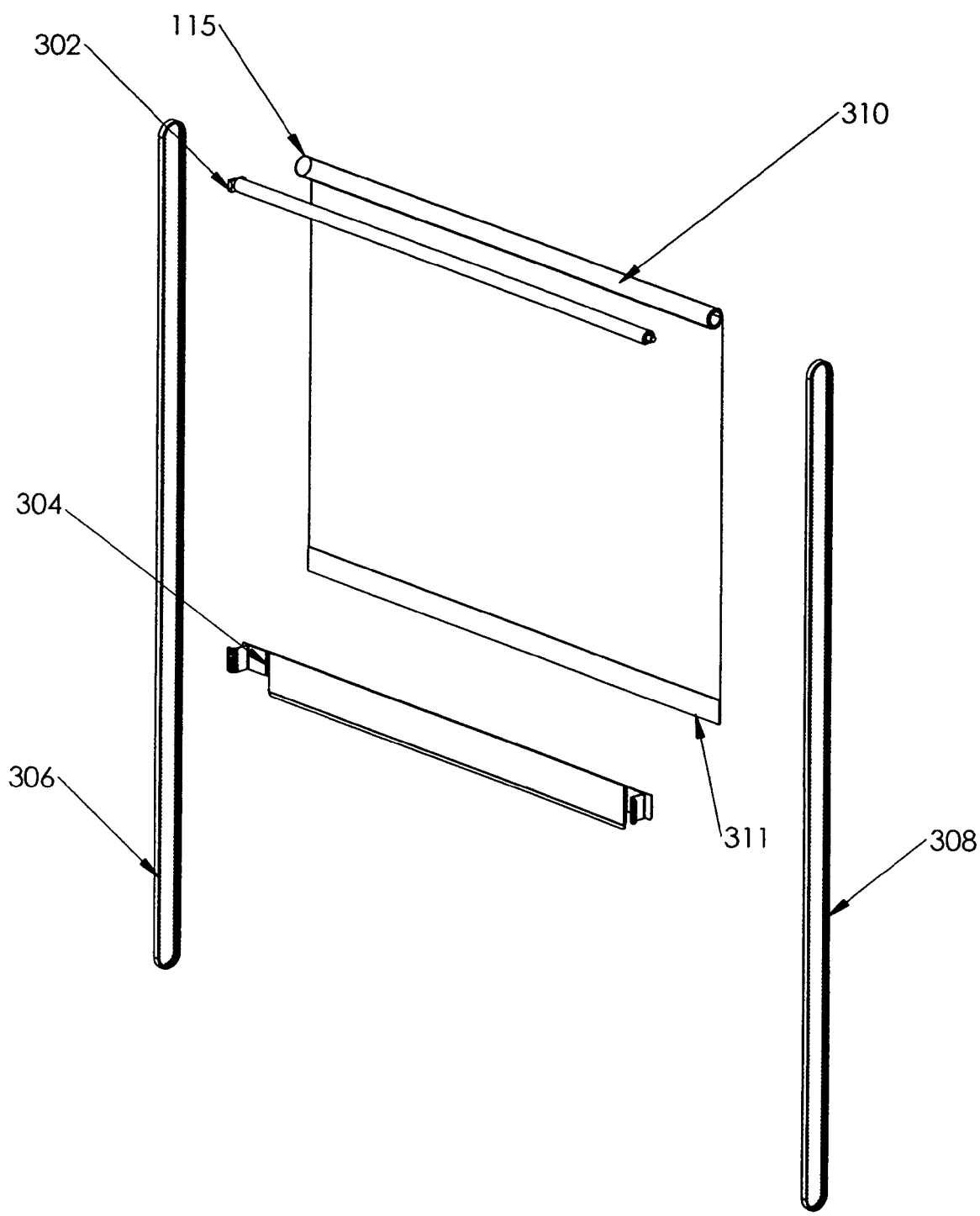
FIG. 3 is an illustrative perspective view of an opaque shade assembly, according to one embodiment of the invention.

Referring to FIG. 3, in one embodiment, an exploded perspective view of an opaque shade assembly is shown. The opaque shade assembly includes the opaque shade 115, an opaque shade axle assembly 302, an opaque shade lead assembly 304, a left opaque shade gear belt 306, and a right opaque shade gear belt 308. The translucent shade 115 includes a top, or fixed, end 310 and a bottom, or free, end 311.

The fixed end 310 is a spring-loaded roller which keeps tension on the opaque shade as it is extended and retracted. The roller is installed on the opaque shade axle assembly 302, which is fixed at the top of shell 110 by having its ends secured to the first and second sidewalls 122, 123 (FIG. 1). The free end 311 is coupled to the lead assembly 304, which extends horizontally between the first and second sidewalls 122, 123. The left opaque shade gear belt 306 extends vertically along the left sidewall 122, and the right opaque shade gear belt 308 extends vertically along the right sidewall 123. The lead assembly 304 is coupled to the left and right gear belts 306, 308 by left and right clips, which are discussed in further detail with respect to FIGS. 5A-5C.

Figure 4A:
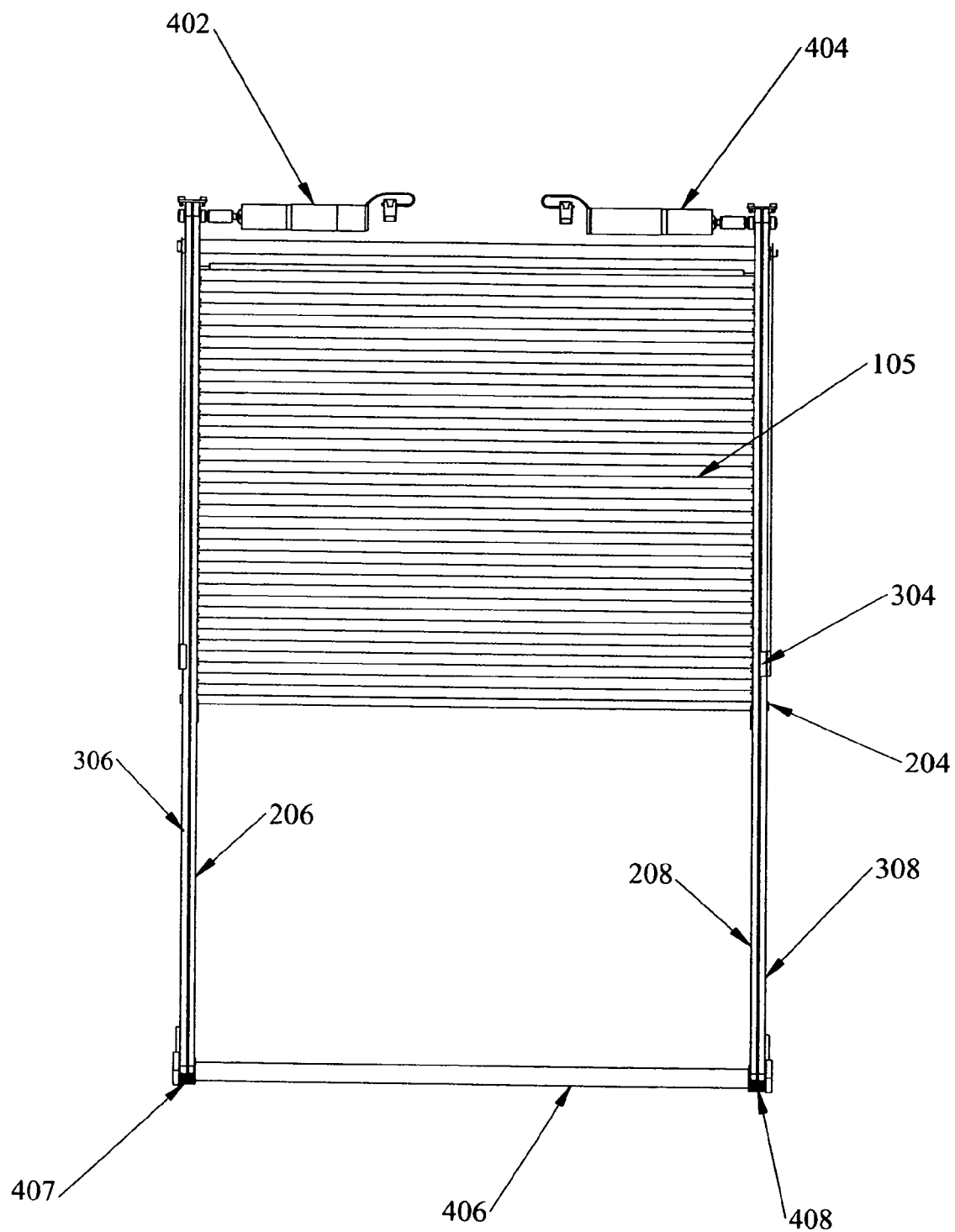
FIG. 4A is an illustrative front view of the translucent and opaque shade assemblies combined with an opaque shade motor assembly, a translucent shade motor assembly, and a lower drive assembly, according to one embodiment of the invention.
Figure 4B:
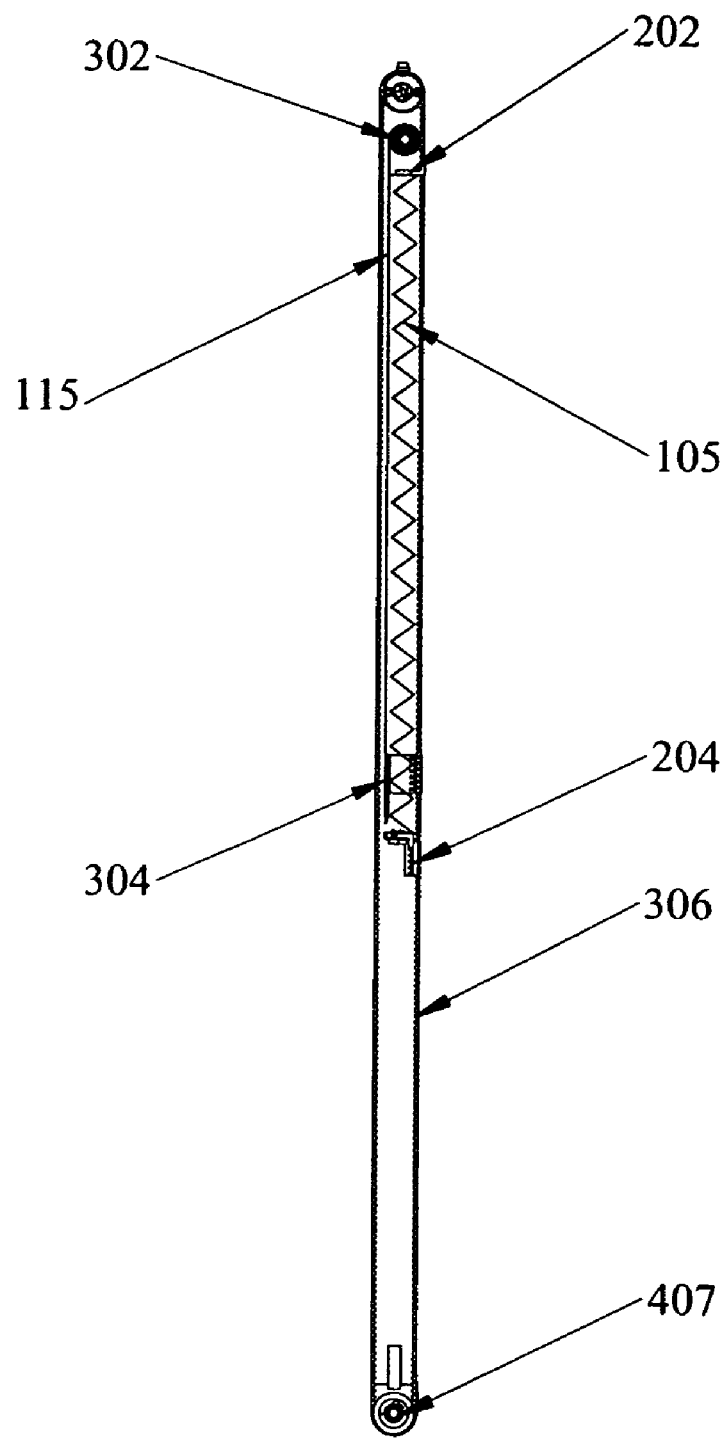
FIG. 4B is an illustrative left side view of the combined assemblies of FIG. 4A.

Referring to FIG. 4A, in one embodiment, an illustrative front view of the translucent and opaque shade assemblies combined with an opaque shade motor assembly 402, a translucent shade motor assembly 404, and a lower drive assembly 406 is shown. FIG. 4B is an illustrative left side view of the combined assemblies of FIG. 4A.

In this embodiment, the translucent shade 105 is in front (i.e. closer to the interior of the aircraft) of the opaque shade 115. The left translucent shade gear belt 206 and the left opaque shade gear belt 306 are coupled to the opaque shade motor assembly 402 and a left end 407 of the lower drive assembly 406 (described in detail below in connection with FIGS. 7A-7D). The right translucent shade gear belt 208 and the right opaque shade gear belt 308 are coupled to the translucent motor assembly 404 and a right end 408 of the lower drive assembly 406. The lead assembly 204 is coupled to the left and right gear belts 206, 208 by left and right clips, which are discussed in further detail with respect to FIGS. 5A-5D. The lead assembly 304 is coupled to the left and right gear belts 306, 308 by left and right clips, which are discussed in further detail with respect to FIGS. 5A-5D. The particular couplings of the gear belts 206, 208, 306, 308 are discussed in further detail with respect to FIGS. 6A-6B and FIGS. 7A-7D.

In one embodiment, and as shown in FIG. 4B, the opaque shade 115 is flat and very thin. It can be retracted (rolled-up) or extended (unrolled) from the opaque shade axle assembly 302. The translucent shade 105 is either pleated or has any other suitable configuration allowing it to be highly compressed upon retraction and expanded upon extension. The translucent shade 105 is designed to be aesthetically attractive whereas opaque shade 115 is designed to be functional. Therefore, the preferred embodiment of the invention prevents opaque shade 115 from being visible to the passengers. This is done by ensuring, mechanically and/or electronically, that shade 105 always covers shade 115.

Figure 5A:
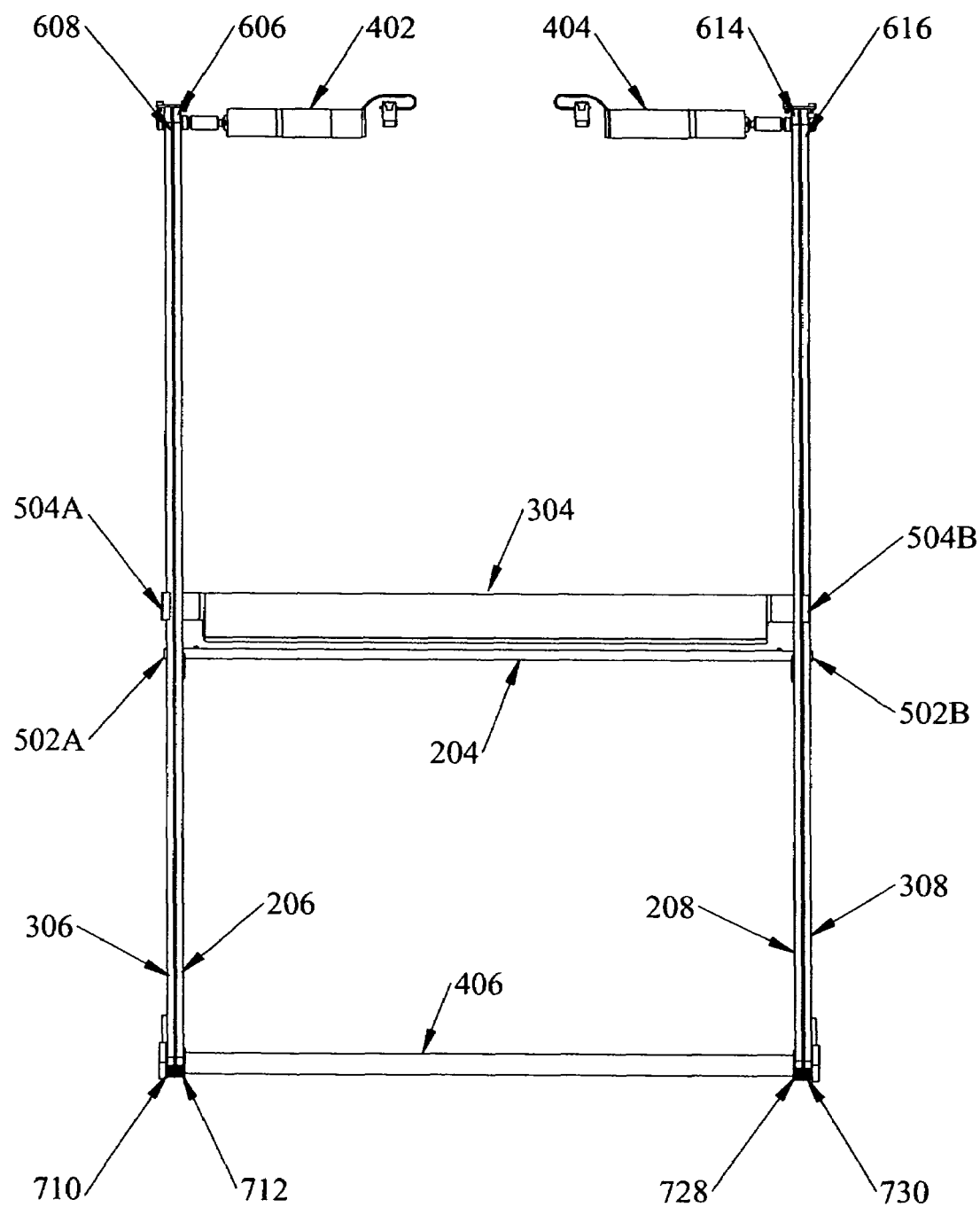
FIG. 5A is an illustrative front view of translucent shade and opaque shade gear belts combined with an opaque shade motor assembly, a translucent shade motor assembly, a lower drive assembly, a translucent shade lead assembly, and an opaque shade lead assembly, according to one embodiment of the invention.

Referring to FIG. 5A, in one embodiment, an illustrative front view of the translucent and opaque shade gear belts 206, 208, 306, 308 combined together with the reversible opaque shade motor assembly 402, the reversible translucent shade motor assembly 404, the lower drive assembly 406, the translucent shade lead assembly 204, and the opaque shade lead assembly 304 is shown. For the sake of simplicity and ease of explanation, shades 105, 115 are not shown.

The translucent shade lead assembly 204 is coupled to the left and right gear belts 206, 208 with clips 502a and 502b, respectively. The opaque shade lead assembly 304 is coupled to the left and right gear belts 306, 308 with clips 504a and 504b respectively. The opaque shade lead assembly 304 sits above the translucent shade lead assembly 204.

In operation, the opaque shade 115 always retracts before, and extends after, the translucent shade 105. This is accomplished by the design and timing of the system, and by the design of the lead assemblies 204 and 304 and the clips 502a-b and 504a-b. The opaque shade 115 is thus never seen by the passenger as it is always covered by the translucent shade 105.

Figure 5B:
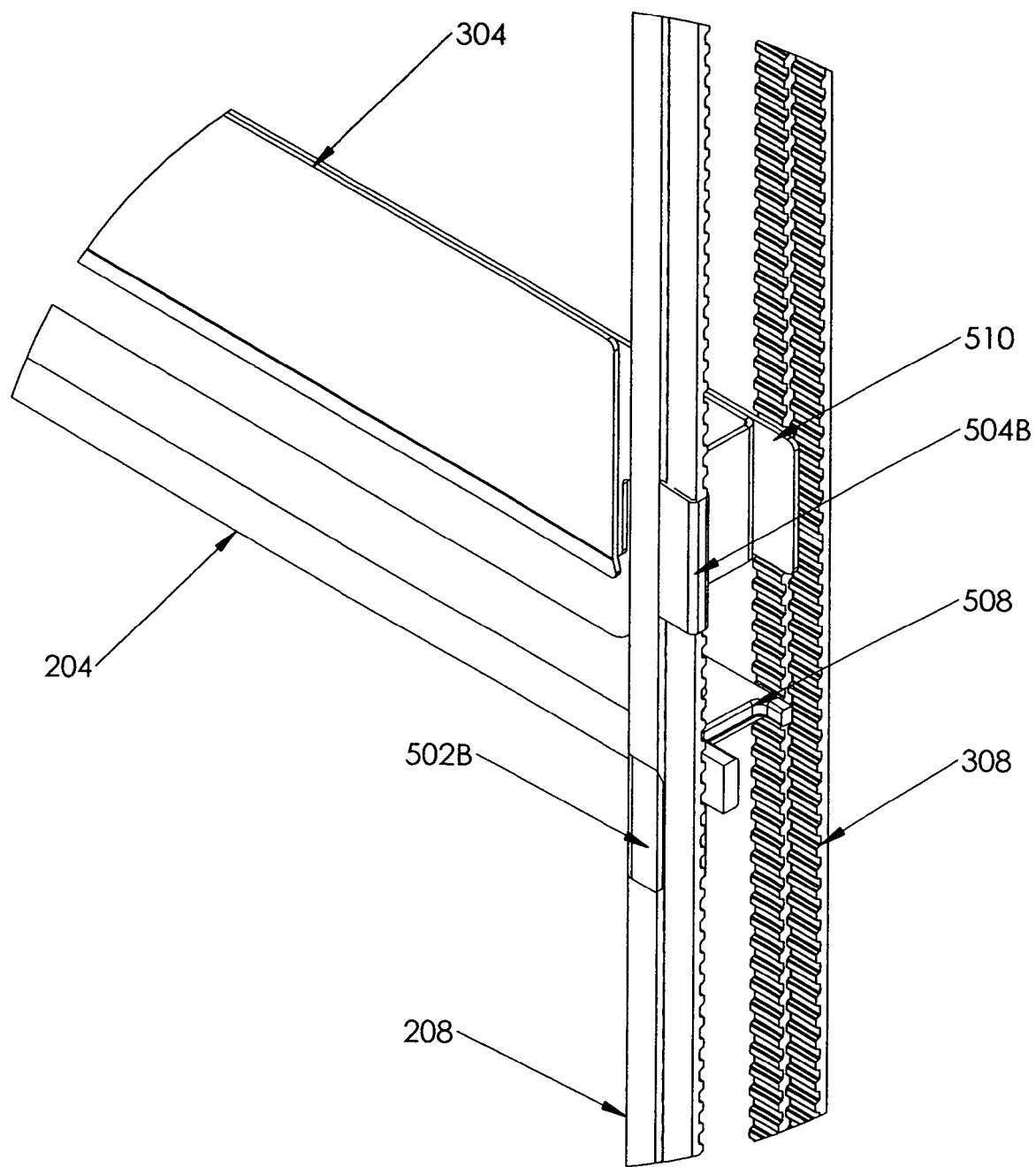
FIG. 5B is an illustrative expanded perspective view of a portion of FIG. 5A and, in particular, of the right end of the translucent shade lead assembly and the right end of the opaque shade lead assembly respectively coupled to the gear belts.
Figure 5C:
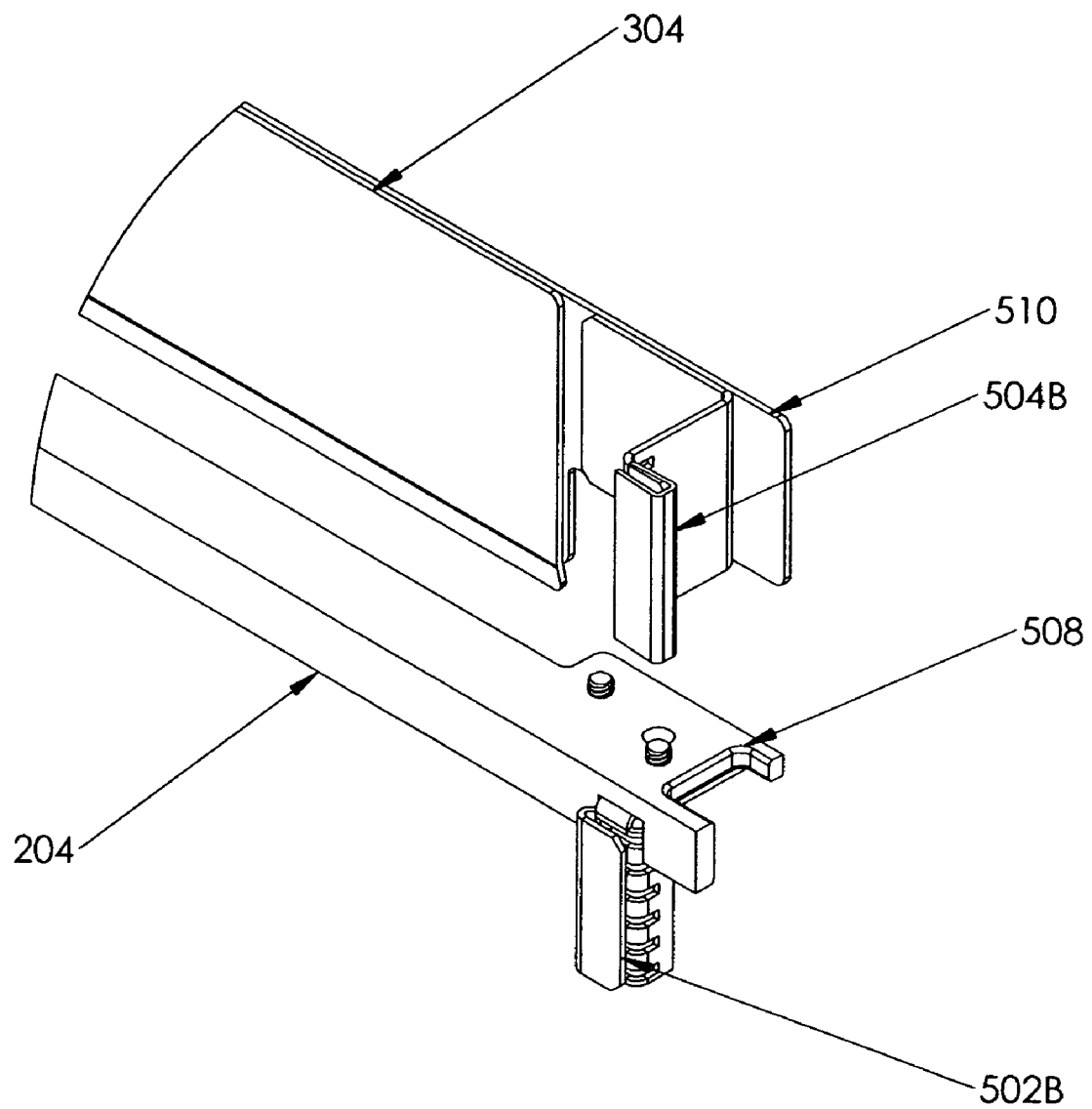
FIG. 5C is an illustrative perspective view of the right end of the translucent shade lead assembly and the right end of the opaque shade lead assembly shown in FIG. 5B.

Referring to FIGS. 5B-5C, in one embodiment, the right ends of the translucent shade lead assembly 204 and the opaque shade lead assembly 304 are shown. The translucent shade lead assembly 204 includes an extending member 508 and the opaque shade lead assembly includes a flat portion 510 that is perpendicular to the extending member 508.

The translucent shade 105 and the opaque shade 115 can be manually raised or lowered via a thumb wheel (described in connection with FIGS. 7A and 7B) on the front of the shell 110. During manual operation to retract the translucent shade 105, the extending portion 508 contacts the perpendicular flat portion 510 to retract both shades 105 and 115 upward together. During manual downward advancement, the perpendicular flat portion 510 contacts the extending portion 508, which prevents the opaque shade 115 from descending past the translucent shade 105 and, thereby, becoming visible to the passengers.

Figure 6A:
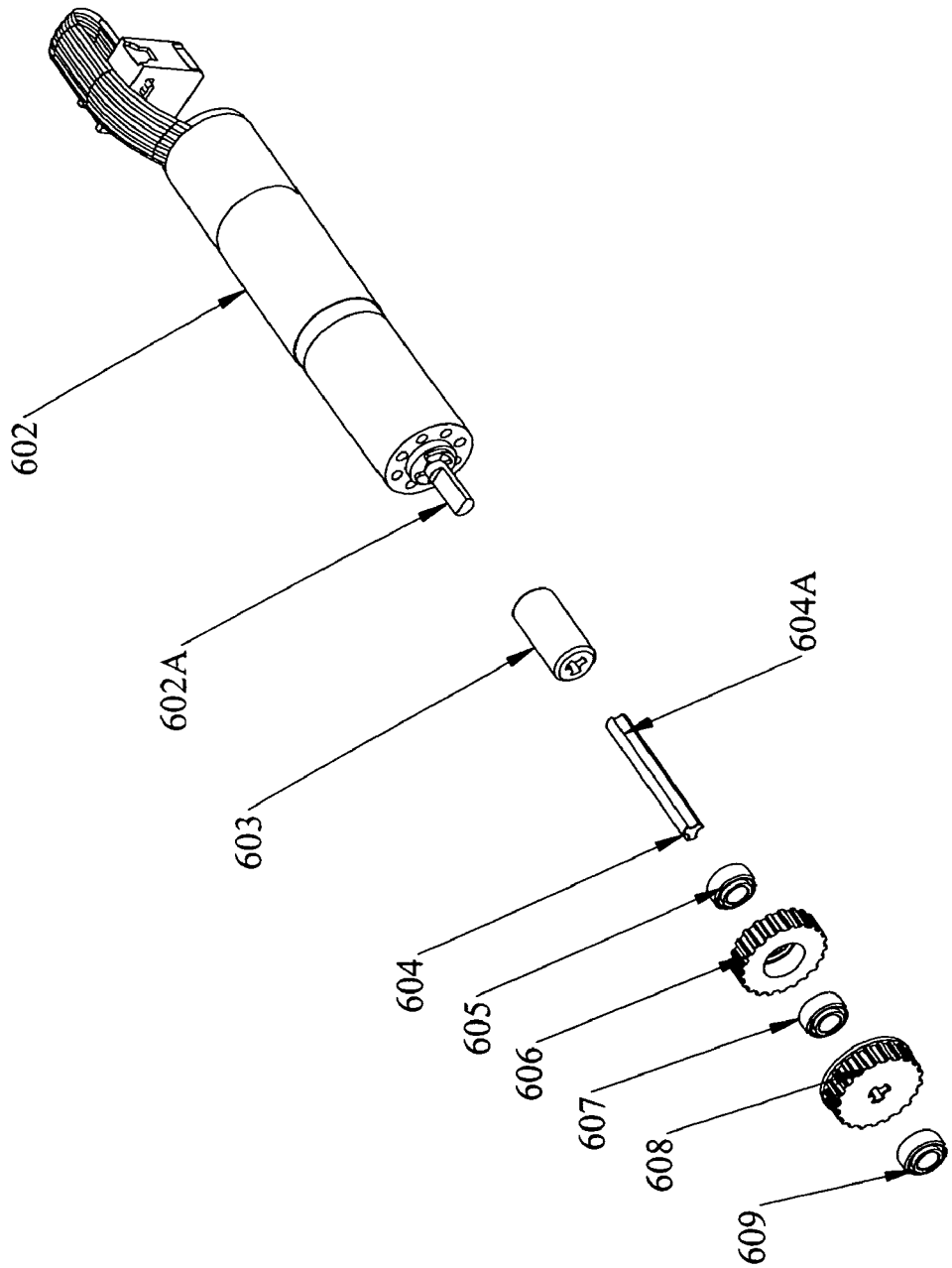
FIG. 6A is an illustrative exploded perspective view of an opaque shade motor assembly, according to one embodiment of the invention.

Referring to FIG. 6A, in one embodiment, an illustrative exploded view of the opaque motor assembly 402 is shown. The opaque motor assembly 402 includes a reversible motor 602, motor shaft 602a, a coupler 603 for coupling motor shaft 602a to a shaft 604, ball bearings 605, 607, 609, a passive (or free turning) gear 606, and a driving gear 608. Ball bearings 605, 607, 609 fit into openings in a motor mount (not shown) which secures the opaque motor assembly 402 to shell 110. Passive gear 606 has an inner radius that allows it to rotate freely on the circular periphery of shaft 604. In contrast, driven gear 608 has an opening shaped to engage splines 604a formed on shaft 604.

In operation, when the reversible motor 602 is running, the reversible motor 602 (via shaft 602a and coupler 603) turns the shaft 604, which turns (drives) the driving gear 608. The driving gear 608 then drives the left opaque shade gear belt 306. The passive gear 606 rotates freely on shaft 604 and remains stationary unless it is driven by the left translucent shade gear belt 206.

Figure 6B:
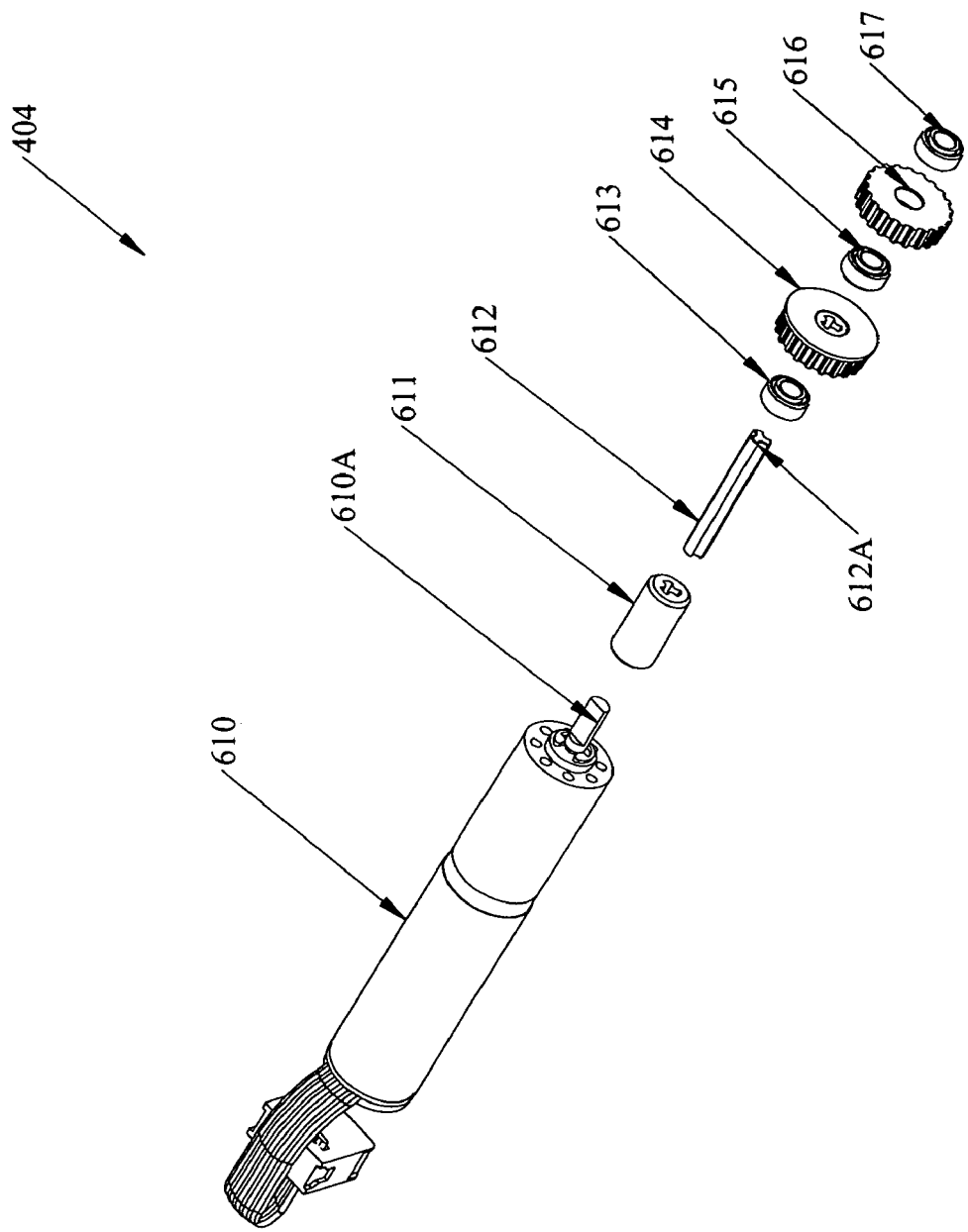
FIG. 6B is an illustrative exploded perspective view of a translucent shade motor assembly, according to one embodiment of the invention.

Referring to FIG. 6B, in one embodiment, an illustrative exploded view of the translucent motor assembly 404 is shown. The translucent motor assembly 404 includes a reversible motor 610, a motor shaft 610a, a coupler 611 for coupling motor shaft 610a to a shaft 612, ball bearing 613, 615, 617, a driving gear 614, and a passive gear 616. Ball bearings 613, 615, 617 fit into openings in a motor mount (not shown) which secures the translucent motor assembly 404 to shell 110. Passive gear 616 has an inner radius that allows it to rotate freely on the circular periphery of shaft 612. In contrast, driving gear 614 has an opening shaped to engage splines 612a formed on shaft 612.

Motors 602 and 610 are available from Portescap as Part No. 1017130019. These motors integrate into one structure a motor (Product Code 13N), a planetary gearbox (Product Code R13), and an encoder.

In operation, when the reversible motor 610 is running, the reversible motor 610 turns the shaft 612, which turns (drives) the driving gear 614. The driving gear 614 then drives the right translucent shade gear belt 208. The passive gear 616 rotates freely on the shaft 612 and remains stationary unless it is driven by the right opaque shade gear belt 308.

Figure 7A:
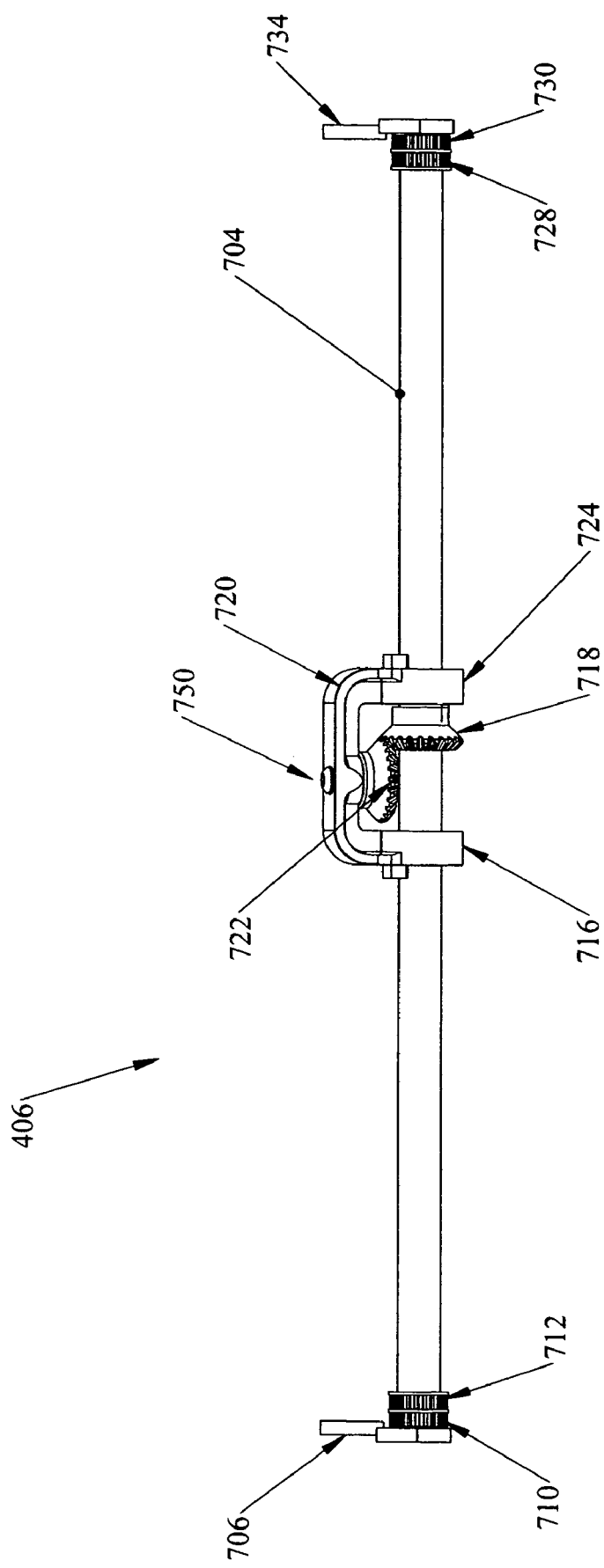
FIG. 7A is an illustrative front view of a lower drive assembly, according to one embodiment of the invention.
Figure 7B:
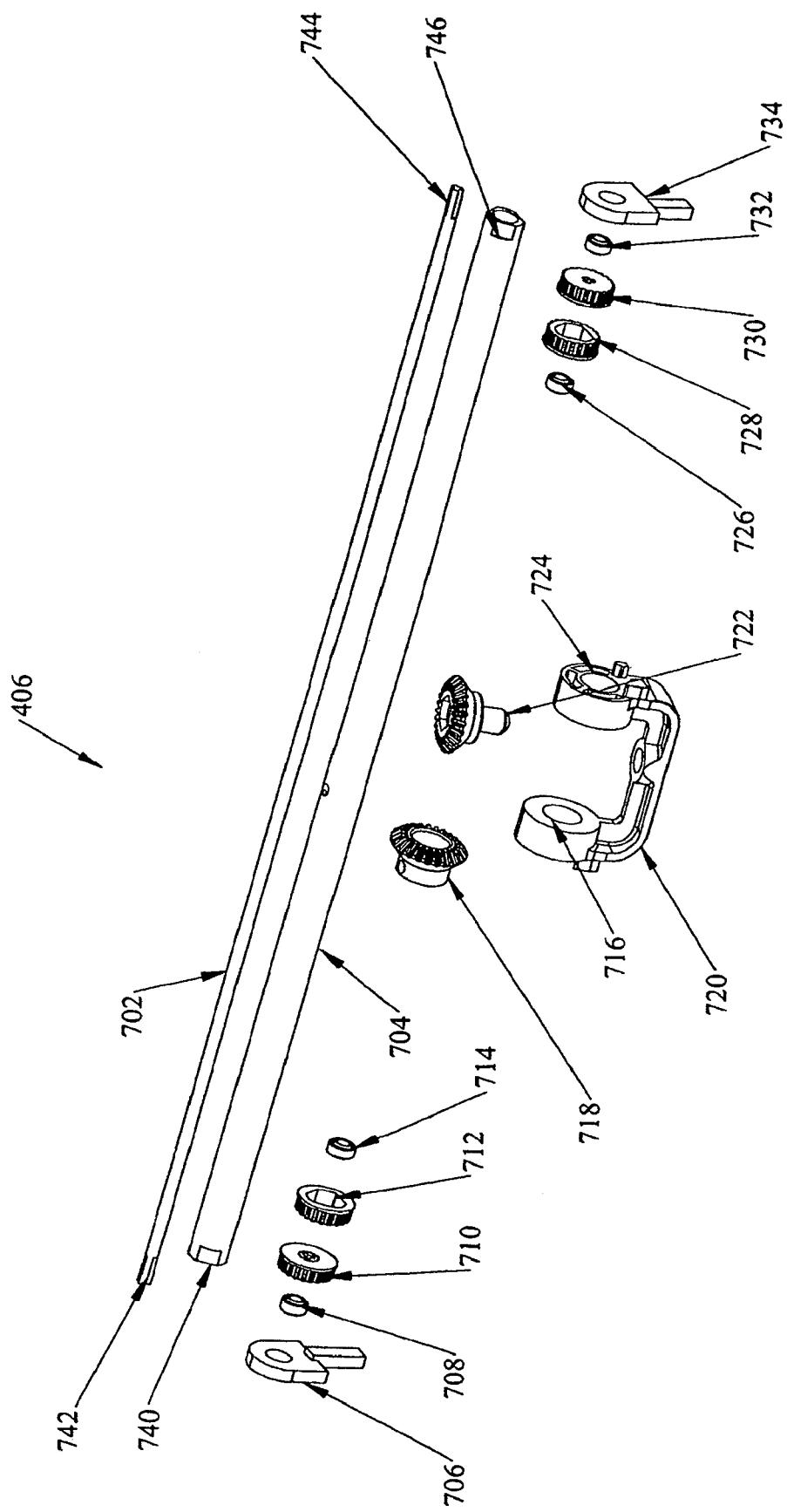
FIG. 7B is an illustrative perspective view of the individual components of the lower drive assembly shown in FIG. 7A.

Referring to FIGS. 7A and 7B, in one embodiment, the lower drive assembly 406 is shown. The lower drive assembly 406 includes an inner axle 702 mounted within an outer axle 704, pillow blocks 706, 734, ball bearings 708, 714, 726, 732, first paired driven gears 710, 730, second paired driven gears 712, 728, and a manual override window shade mechanism 750. The manual override window shade mechanism 750 includes a bevel gear housing 720, an active bevel gear 718, a pinion bevel gear 722, and needle bearing 716, 724. First paired driven gears 710, 730 are mounted in vertical alignment with opaque shade gears 608, 616. Likewise, second paired driven gears 712, 728 are mounted in vertical alignment with translucent shade gears 606, 614. This alignment facilitates the movement of belts 206, 208, 306 and 308.

Figure 7C:
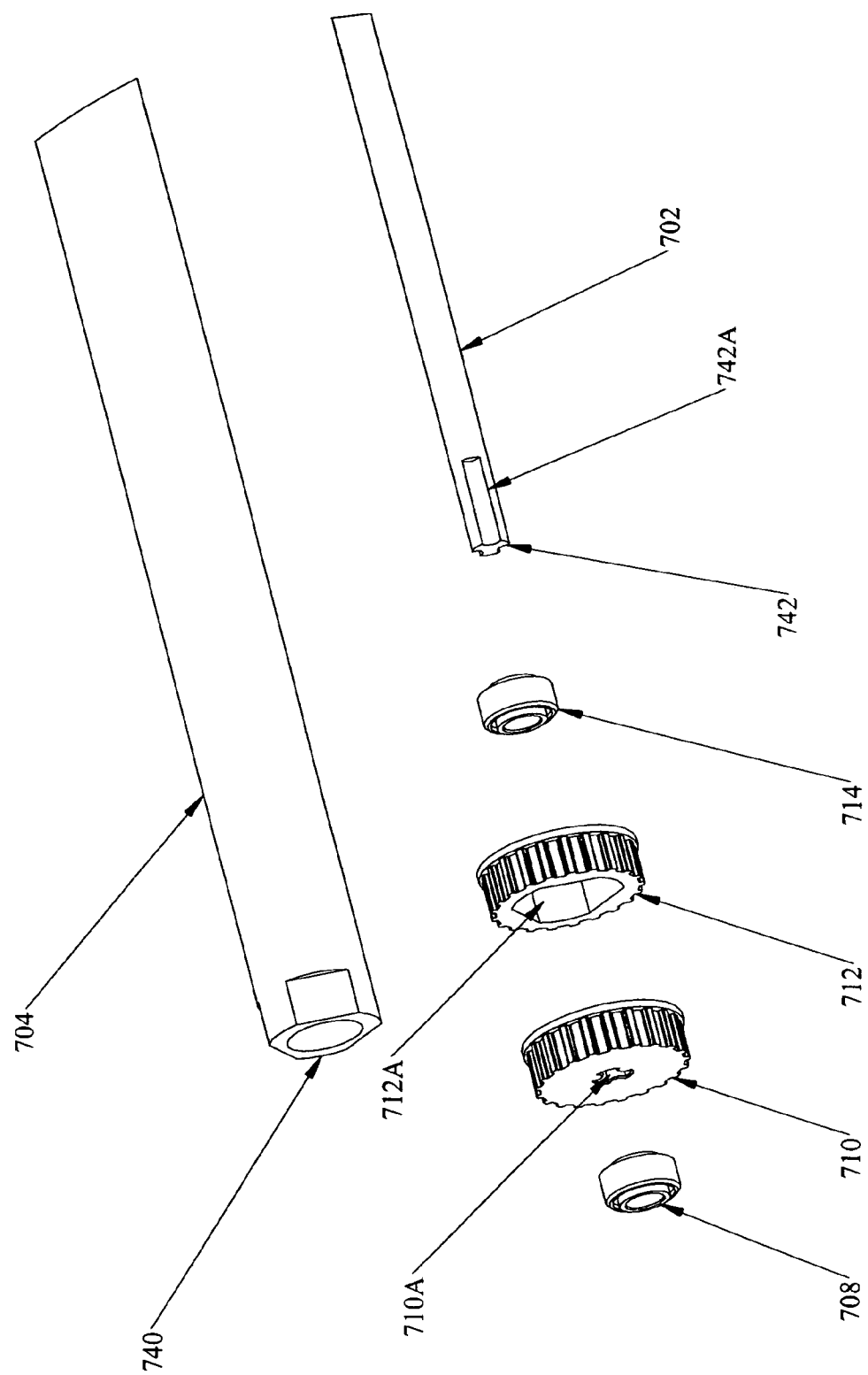
FIG. 7C is an illustrative exploded perspective view of the left end of the lower drive assembly shown in FIG. 7A.
Figure 7D:
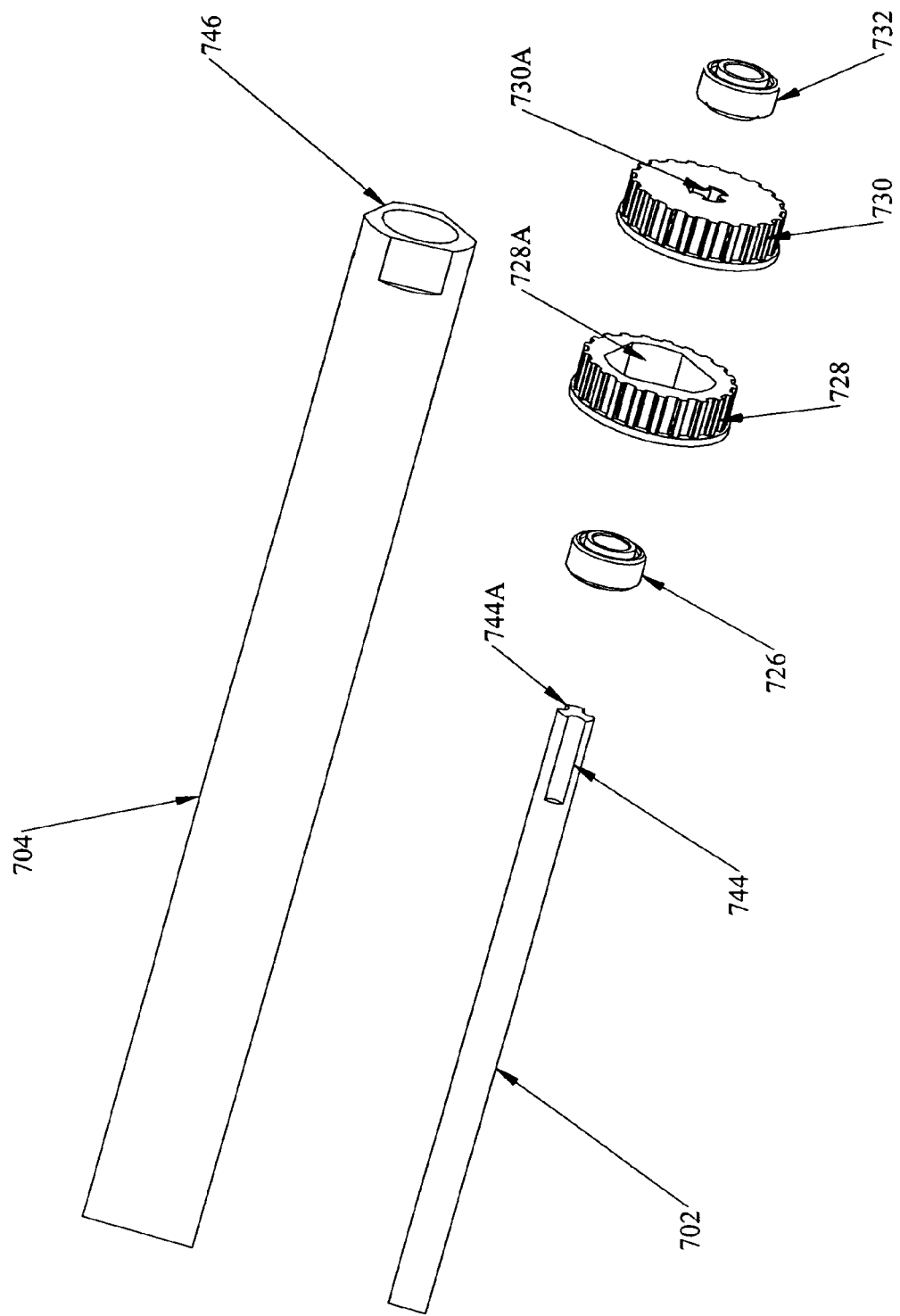
FIG. 7D is an illustrative exploded perspective view of the right end of the lower drive assembly shown in FIG. 7A.
Figure 8A:
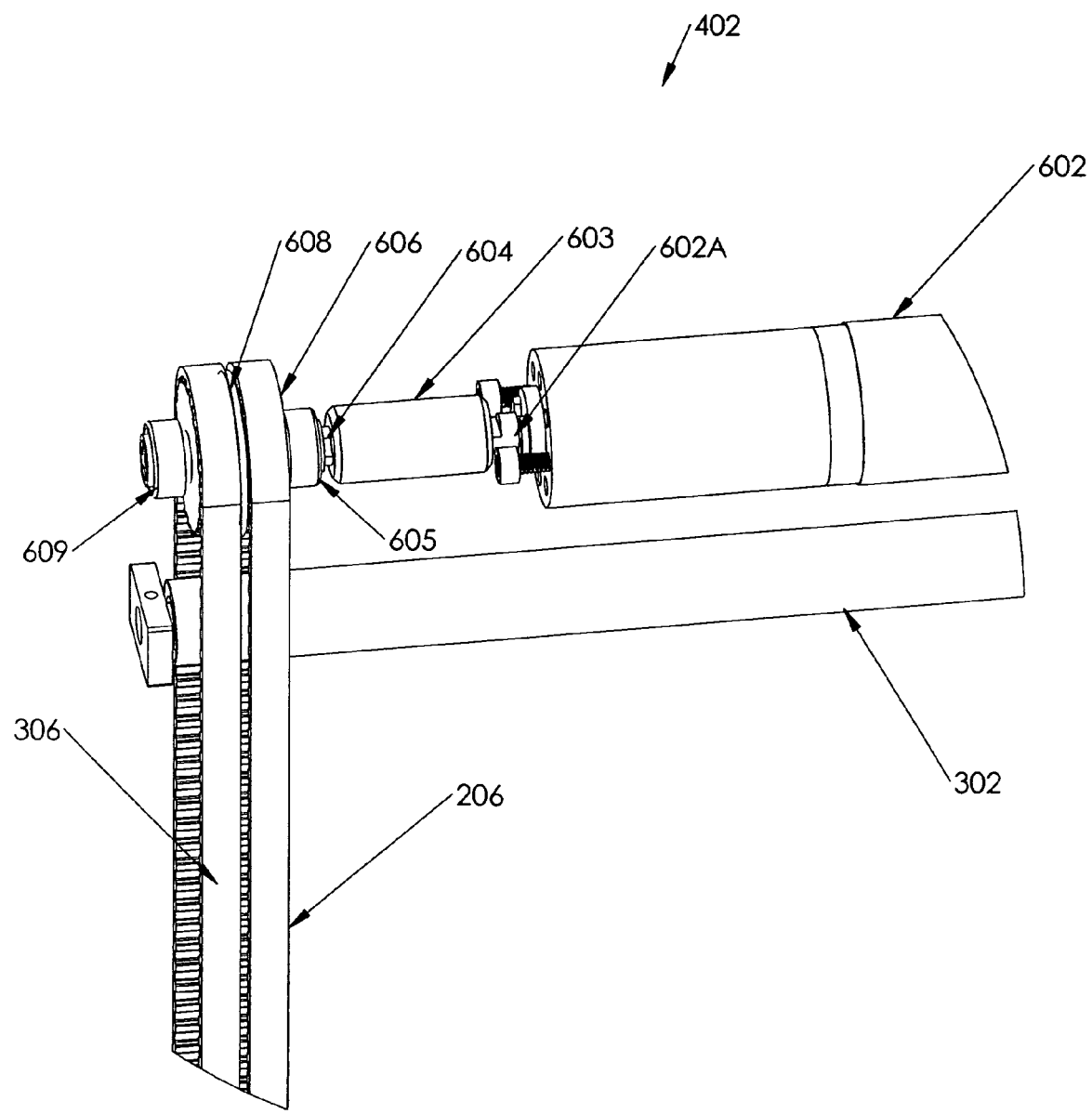
FIG. 8A is an illustrative perspective view of the opaque shade motor assembly coupled to the left opaque shade gear belt and the left translucent shade gear belt, according to an embodiment of the invention.
Figure 8B:
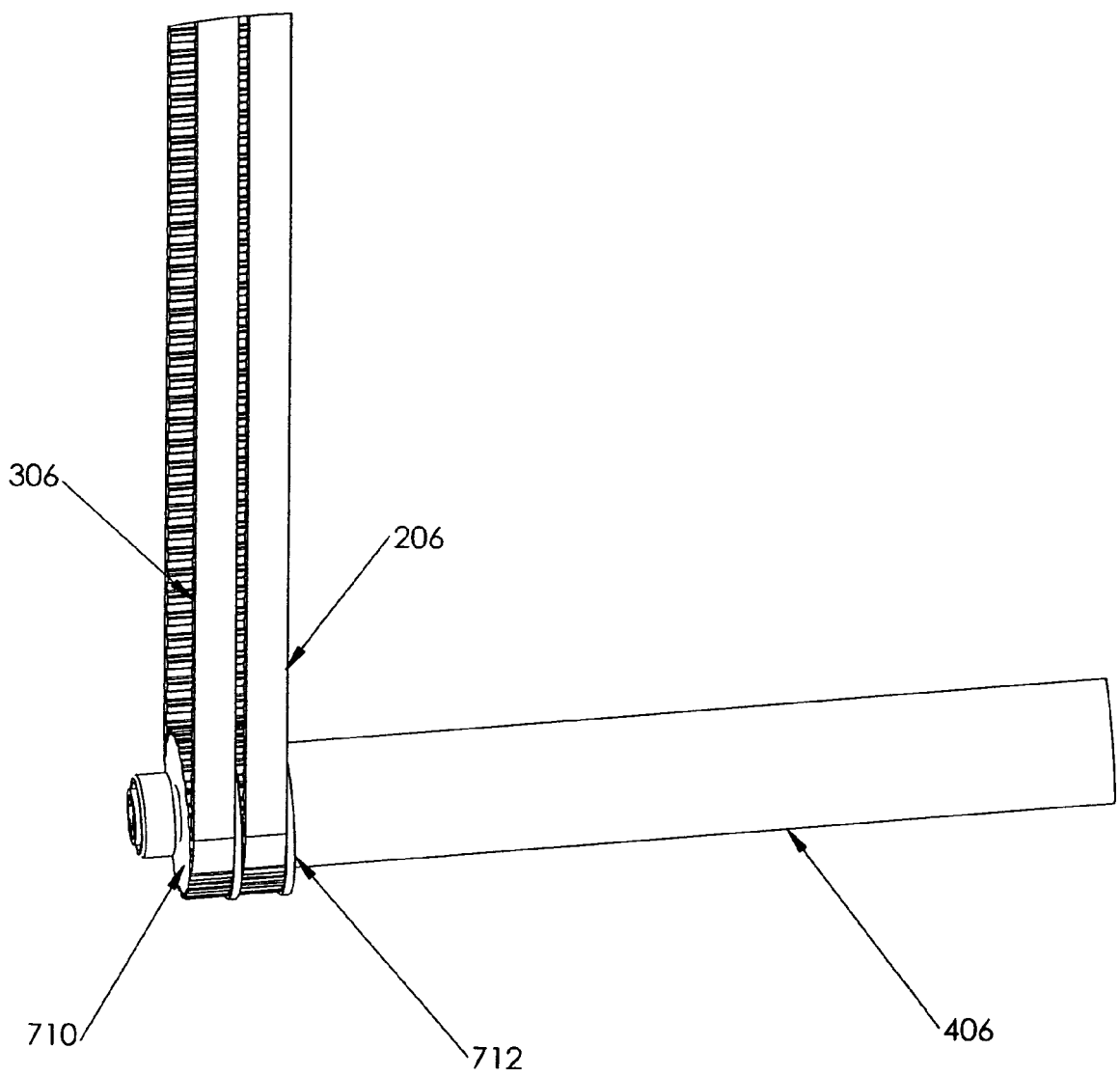
FIG. 8B is an illustrative perspective view of the left opaque shade gear belt and the left translucent shade gear belt coupled to the lower drive assembly, according to one embodiment of the invention.
Figure 8C:
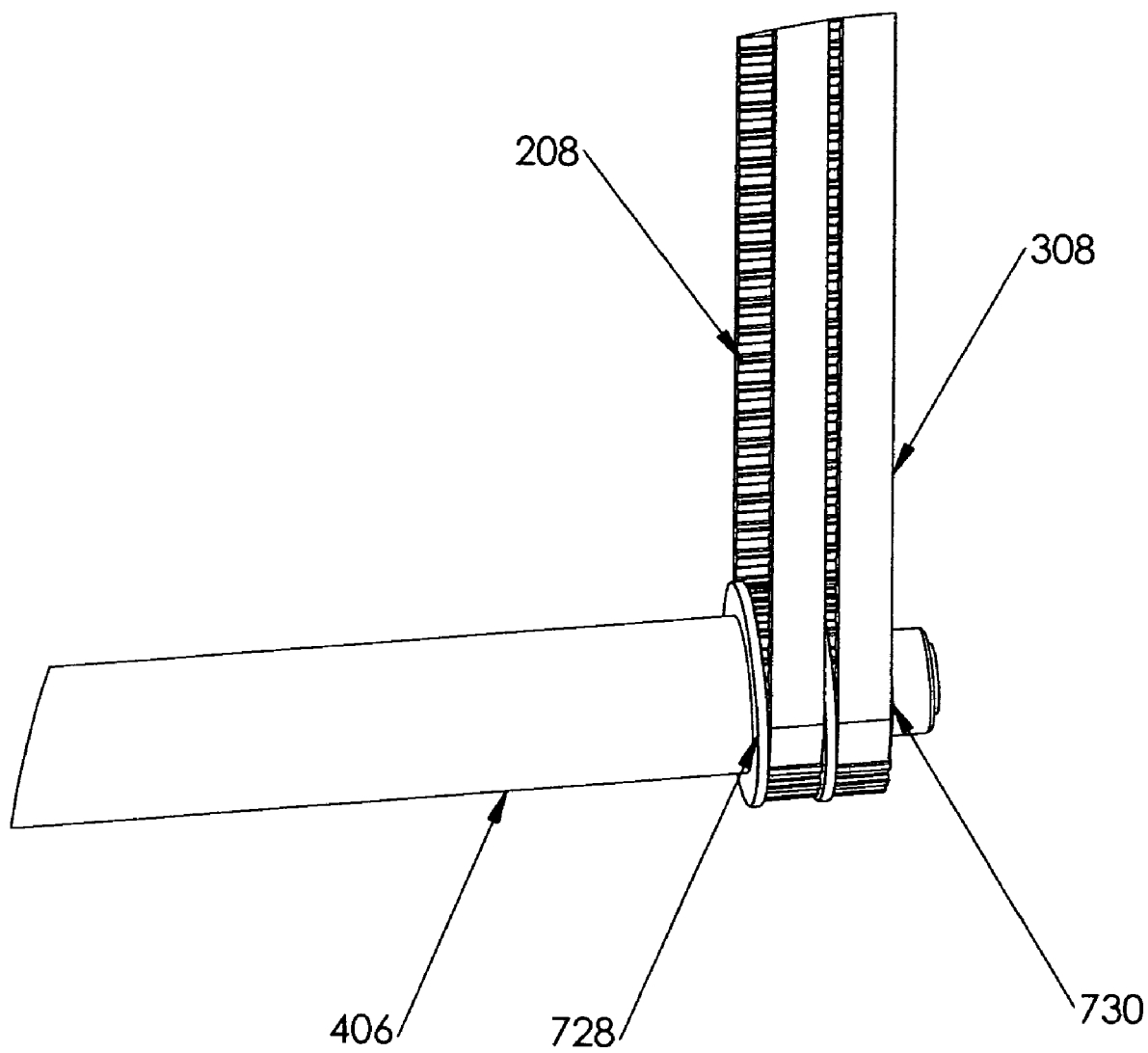
FIG. 8C is an illustrative perspective view of the lower drive assembly coupled to the right opaque shade gear belt and the right translucent shade gear belt, according to one embodiment of the invention.
Figure 8D:
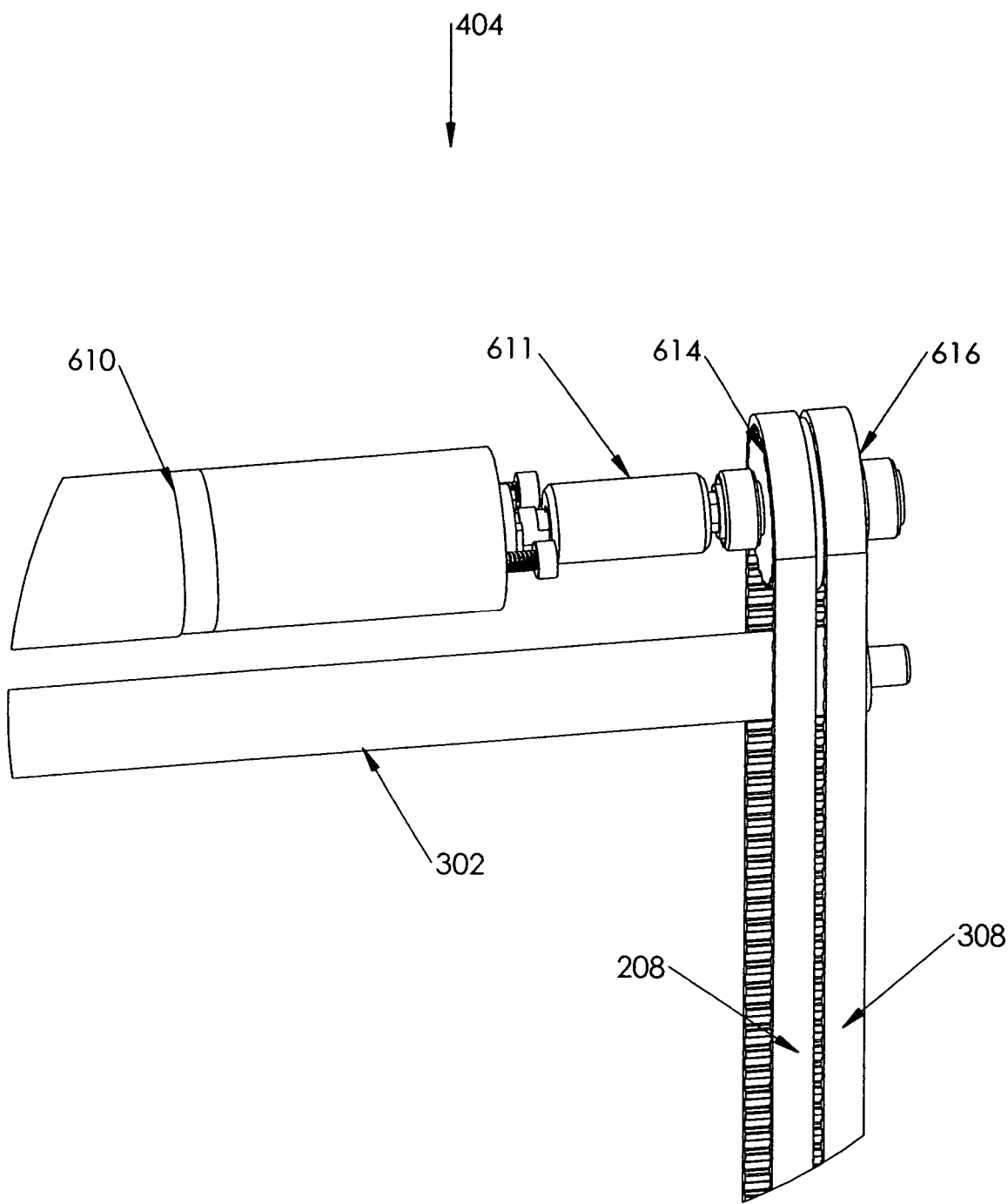
FIG. 8D is an illustrative perspective view of the translucent shade motor assembly coupled to the right opaque shade gear belt and the right translucent shade gear belt, according to embodiment of the invention.

Referring to FIGS. 7C and 7D, illustrative exploded perspective views of the left and right ends of the lower drive assembly 406 are shown. Ball bearings 714, 726 are pressed onto opposite ends of inner axle 702 passed the splined ends 742a, 744a and are sized to fit tightly within outer axle 704. Ball bearings 714, 726 thus enable inner axle 702 to rotate within and independently of outer axle 704. Ball bearings 708, 732 fit respectively within pillow blocks 706, 734 which are secured to shell 110. With ball bearings 708, 732 on opposite tips of inner axle 702, it can rotate relative to shell 110. Thus, this arrangement allows inner axle 702 to rotate on shell 110, with outer axle 704 and inner axle 702 being rotatable independently of each other.

The first paired driven gears 710, 730 are on opposite ends of inner axle 702. Splined ends 742a, 744a drivingly engage correspondingly shaped openings 710a, 730a in driven gears 710, 730. The second paired driven gears 712, 728 are on opposite ends 740, 746 of outer axle 704. The five-sided peripheral shape of ends 740, 746 correspond to and drivingly engage openings 712a, 728a in gears 712, 728.

In operation, and as previously described, when the reversible motor 602 (FIG. 6A) is running, the reversible motor 602 turns the shaft 604, which turns (drives) the driving gear 608. The driving gear 608 then drives the left opaque shade gear belt 306 (see FIG. 8A). The left opaque shade gear belt 306, which is coupled to the driving gear 710, drives gear 710, which is coupled to the left end 742 of the inner axle 702 (see also FIG. 8B). As the gear 710 turns, it turns the inner axle 702. The right end 744 of the inner axle 702 is coupled to the driven gear 730. The inner axle 702 drives the gear 730, which then drives the right opaque shade gear belt 308 (see FIG. 8C). The right opaque shade gear belt 308 then turns the passive gear 616 (see FIG. 8D).

Also as previously described, when the reversible motor 610 (FIG. 6B) is running, the reversible motor 610 turns the shaft 612, which turns (drives) the driving gear 614. The driving gear 614 then drives the right translucent shade gear belt 208 (see FIG. 8D). The right translucent shade gear belt 208, which is coupled to the gear 728, drives the driven gear 728, which is coupled to the right end 746 of the outer axle 704 (see also FIG. 8C). The driven gear 728 turns the outer axle 704. The left end 740 of the outer axle 704 is coupled to the driven gear 712. The outer axle 704 drives the gear 712, which then drives the left translucent shade gear belt 206 (see FIG. 8B). The left translucent shade gear belt 206 then turns the passive gear 606 (see also FIG. 8A).

With the above-described arrangement, rotation of motor shaft 602a is applied by belts 306, 308 uniformly to opaque shade 115 so that it moves smoothly up and down under motor power without binding. Likewise, rotation of motor shaft 610a is applied by belts 206, 208 uniformly to translucent shade 115 so that it moves smoothly up and down under motor power without binding.

Referring again to FIGS. 7A and 7B, the manual override window shade mechanism 750 includes the bevel gear housing 720, the active bevel gear 718, which is fixed, such as by a set screw, to outer axle 704, the pinion bevel gear 722, and the bearings 716, 724. Bearings 716, 724 enable outer axle 704 to rotate with respect to housing 720. Housing 720 is suitably secured in any well known manner to shell 110.

In operation, when the window shade mechanism is operated manually, a passenger turns a thumbwheel (not shown) at the bottom of shell 110 that turns the pinion bevel gear 722. The pinion bevel gear 722 engages and turns the active bevel gear 718, which causes the outer axle 704 to turn. The outer axle 704 then drives the paired driven gears 712, 728, which drive the translucent shade gear belts 206, 208. This causes the coupled translucent shade lead 204 to selectively either extend or retract the translucent shade 105. As previously described, the translucent shade lead 204 includes the extending portion 508. The extending portion 508 contacts the perpendicular flat portion 510 of the opaque shade lead 304 when the translucent shade is manually raised and thereby raises the opaque shade 115. Further, because of the extending portion 508, the opaque shade lead 304 will never fall below the translucent shade lead 204, when the translucent shade 105 is manually lowered.

Figure 9:
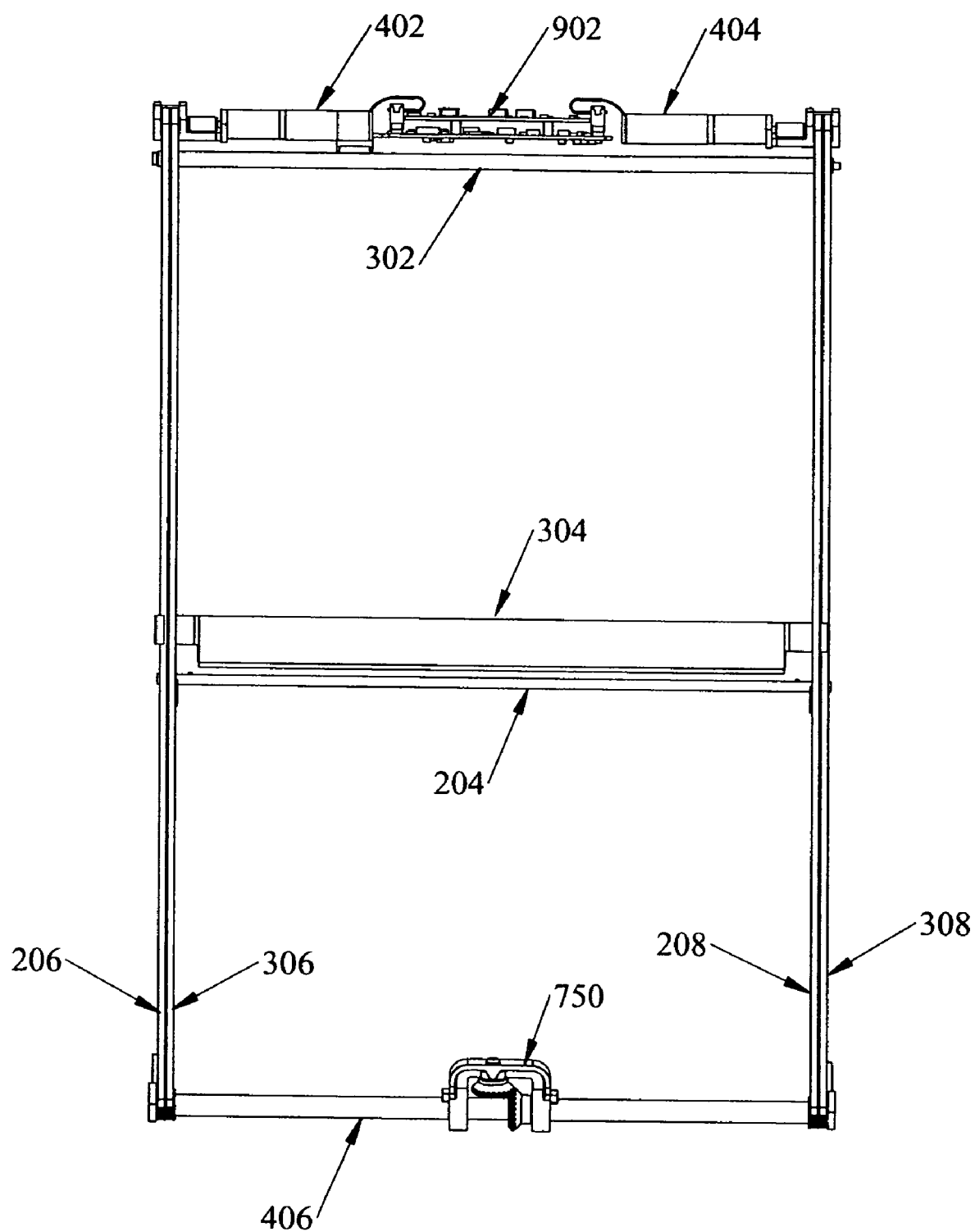
FIG. 9 is an illustrative front view of the motorized window shade mechanism including control electronics, according to one embodiment of the invention.

Referring to FIG. 9, another illustrative front view of a motorized window shade mechanism in accordance with an embodiment of the invention is shown. The opaque motor assembly 402 and translucent motor assembly 404 are controlled by control electronics 902, as described in detail with respect to FIG. 10.

Figure 10:
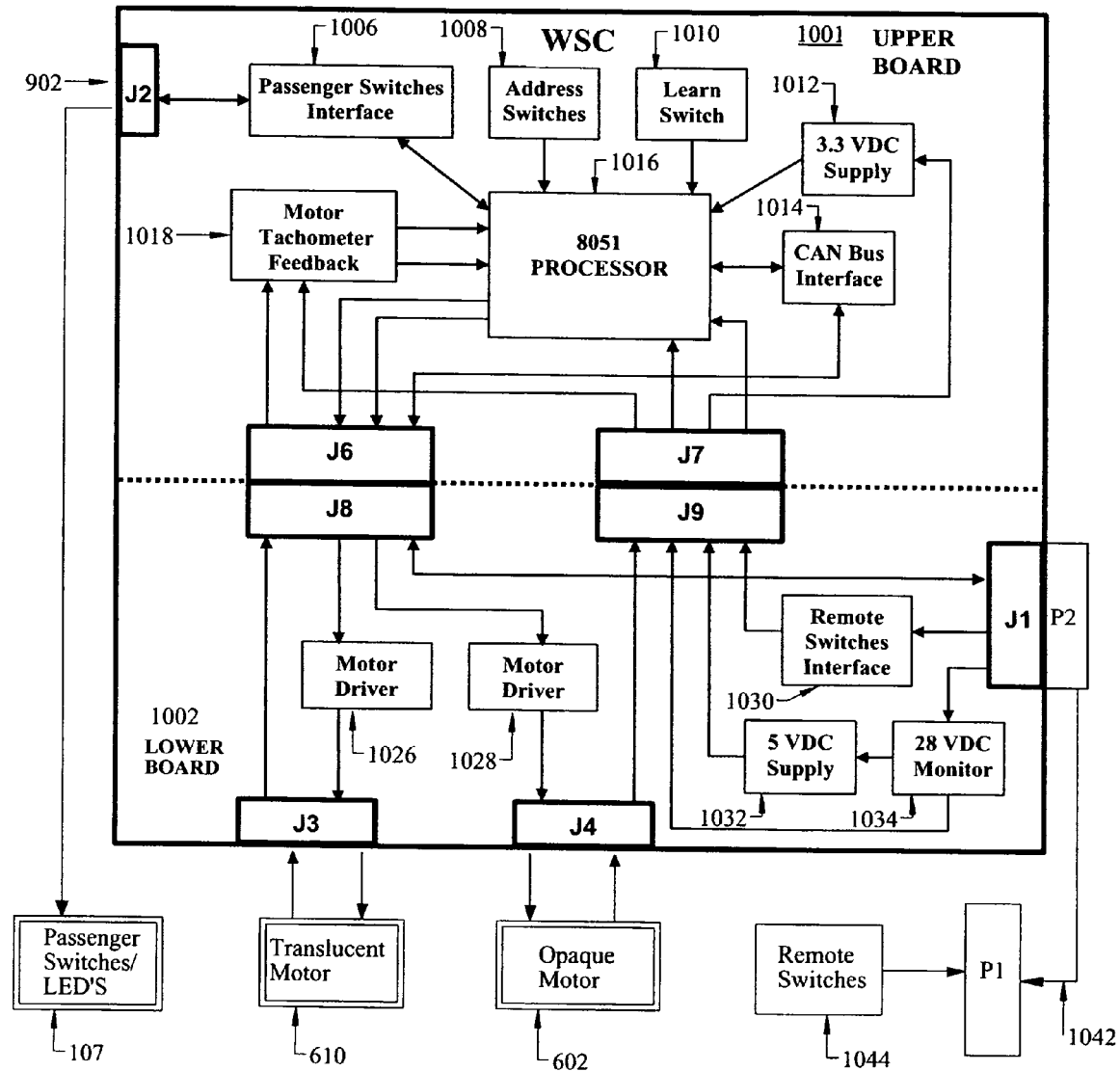
FIG. 10 is an illustrative block diagram of the control electronics for the motorized window shade mechanism, according to one embodiment of the invention.

Referring to FIG. 10, in one embodiment, an illustrative block diagram of the control electronics 902 for the motorized window shade mechanism is shown. The control electronics 902 include an upper circuit board 1001 and a lower circuit board 1002. The upper circuit board 1001 and the lower circuit board 1002 are in communication via a connection between connector J6 and connector J8 and a connection between connector J7 and connector J9.

The upper circuit board 1001 includes passenger switches interface 1006, address switches 1008, seek switch 1010, 3.3 VDC power supply 1012, motor tachometer feedback circuit 1018, processor 1016, CAN bus interface 1014 and connector J2.

The lower circuit board 1002 includes motor driver 1026, motor driver 1028, remote switches interface 1030, 5 VDC supply 1032, 28 VDC monitor 1034, connector J1, connector J3, and connector J4.

The processor 1016 controls all of the functions of the window shade mechanism. The processor 1016 can be, for example, an 8051 microcontroller. The processor is, in turn, controlled by the passenger switches 107 (via the connector J2) or by remote switches 1044. The remote switches 1044, in one embodiment, are operated by a flight attendant or a pilot, and can be located at a flight attendant station or pilot cabin. The remote switches are connected to connector P1, which is connected to cable 1042. The cable 1042 is connected to connector P2, which communicates with the lower circuit board 1002 via connector J1. The connector J1 is connected to the remote switches interface 1030, which communicates with the processor 1016 via a connection between connector J9 and connector J7. Upon receiving a command from the passenger switches 107 or the remote switches 1044, the processor 1016 communicates with the motor driver 1026 and/or the motor driver 1028 to actuate the reversible motor 610 (translucent shade) and/or the reversible motor 602 (opaque shade), respectively.

Although certain embodiments of the invention have been described in detail above, various modifications thereto will readily occur to anyone with ordinary skill in the art. For example, the placement of the various gears in the different assemblies can vary. Also, the sequence of extending and retracting the translucent shade and opaque shade relative to each other need not necessarily be restricted to what has been described above. It is a matter of choice to be able to bring both shades down and/or up together rather than sequentially. Also, given a suitable opaque shade, it is possible to have it be visible to the passengers. All these and other such modifications are intended to fall within the scope of the present invention as defined by the following claims.

I claim:

1. A window comprising:
   a housing defining a first opening and a second opening, and comprising a first end, a second end, a first sidewall, and a second sidewall, the first and second sidewalls extending between the first end and the second end;
   a first window shade comprising a fixed end and a free end, the first window shade being disposed inside the housing, the fixed end extending between the first and second sidewalls and being fixed proximate to the first end of the housing, the free end extending between the first and second sidewalls and being movable along the first and second sidewalls between a retracted position, where the passage of light through the first and second openings is unobstructed by said first window shade, and an extended position, where the passage of light through the first and second openings is obstructed by said first window shade;
   a second window shade comprising a fixed end and a free end, the second window shade being disposed inside the housing, the fixed end extending between the first and second sidewalls and being fixed proximate to the first end of the housing, the free end extending between the first and second sidewalls and being movable along the first and second sidewalls between a retracted position, where the passage of light through the first and second openings is unobstructed by the second window shade, and an extended position, where the passage of light through the first and second openings is obstructed by the second window shade;
   a first motor secured proximate to the first end of the housing;
   a second motor secured proximate to the first end of the housing;
   a first rotation means rotatably secured proximate to the first end of the housing;
   a second rotation means rotatably secured proximate to the first end of the housing;
   a first rotatable shaft comprising a first end and a second end, the first rotatable shaft being rotatably secured proximate to the second end of the housing and disposed between the first and second sidewalls;
   a second rotatable shaft comprising a first end and a second end, the second rotatable shaft being rotatably secured proximate to the second end of the housing and disposed between the first and second sidewalls;
   first rotation coupling means extending along the first sidewall between the first motor and the first end of the second rotatable shaft to drive the second rotatable shaft in response to operation of the first motor;
   second rotation coupling means extending along the second sidewall between the second end of the second rotatable shaft and the second rotation means to drive the second rotation means in response to operation of the first motor;
   third rotation coupling means extending along the second sidewall between the second motor and the second end of the first rotatable shaft to drive the first rotatable shaft in response to operation of the second motor;
   fourth rotation coupling means extending along the first sidewall between the first end of the first rotatable shaft and the first rotation means to drive the first rotation means in response to operation of the second motor;
   means for coupling the free end of the first window shade between the third and fourth rotation coupling means so that the first window shade is retracted or extended in response to operation of the second motor; and
   means for coupling the free end of the second window shade between the first and second rotation coupling means so that the second window shade is retracted or extended in response to operation of the first motor.

2. The window of claim 1, wherein the first shade comprises translucent material.

3. The window of claim 1, wherein the second shade comprises opaque material.

4. The window of claim 1, wherein the second shade retracts before the first shade retracts.

5. The window of claim 1, wherein the first shade extends substantially fully before the second shade extends.

6. The window of claim 1, wherein the first and second rotation coupling means respectively comprise a gear belt.

7. The window of claim 1, wherein the third and fourth rotation coupling means respectively comprise a gear belt.

8. The window of claim 1, wherein the first and second rotation means respectively comprise a gear.

9. The window of claim 1, wherein the first and second motors respectively comprise a reversible motor.

10. The window of claim 1, wherein the second rotatable shaft is rotatably secured inside and coaxial with the first rotatable shaft so that the first and second rotatable shafts are rotatable independently of each other.

11. The window of claim 10, wherein the first end of the second rotatable shaft extends beyond the first end of the first rotatable shaft, the second end of the second rotatable shaft extends beyond the second end of the first rotatable shaft.

12. The window of claim 1, further comprising a first window pane and a second window pane, the first and second window panes being disposed inside the housing, the first window pane covering the first opening and the second window pane covering the second opening.

13. The window of claim 12, wherein said first window shade is disposed between the first and second window panes.

14. The window of claim 13, wherein the second window shade is disposed between said first window shade and said second window pane.

15. The window of claim 1, wherein the first and second rotation means are rotatably secured to but not driven by the first and second motors, respectively.

16. The window of claim 1, wherein the first and fourth rotation coupling means are coupled to the first motor and wherein the second and third rotation coupling means are coupled to the second motor.

17. The window of claim 1, further comprising:
a first transmission shaft driven by the first motor, and
a first driving means coupled to and driven by the first transmission shaft,
the first rotation means being rotatably supported on the first transmission shaft.

18. The window of claim 17, further comprising:
a second transmission shaft driven by the second motor, and
a second driving means coupled to and driven by the second transmission shaft,
the second rotation means being rotatably supported on the second transmission shaft.

19. The window of claim 11, further comprising:
a first driven means secured to the first end of the second rotatable shaft for transmitting motion between the first rotation coupling means and the second rotatable shaft; and
a second driven means secured to the first end of the first rotatable shaft for transmitting motion between the fourth rotation coupling means and the second rotatable shaft.

20. The window of claim 19, further comprising:
a third driven means secured to the second end of the second rotatable shaft for transmitting motion between the third rotation coupling means and the first rotatable shaft; and
a fourth driven means secured to the second end of the second rotatable shaft for transmitting motion between the third rotation coupling means and the first rotatable shaft.

21. The window of claim 1, further comprising first and second shade supports positioned proximate to the first end of the housing and extending between the first and second sidewalls, wherein the first and second shade supports are attached to the fixed ends of the respective first and second window shades, and wherein the second shade support is positioned above and substantially aligned with the first shade support.

22. The window of claim 1, further comprising first and second lead assemblies separately formed from and fixed to the respective free ends of the first and second window shades, wherein the means for coupling the free ends of the first and second window shades are formed on the first and second lead assemblies, respectively.

23. The window of claim 22, wherein the first lead assembly has first and second ends configured to engage the third and fourth rotation coupling means and wherein the second lead assembly has first and second ends configured to engage the first and second rotation coupling means.

24. The window of claim 22, wherein the means for coupling comprise at least one clip.

25. The window of claim 22, wherein the second lead assembly is substantially aligned above the first lead assembly.

26. The window of claim 1, further comprising a manual override window shade mechanism which comprises:
a bevel gear housing secured to the housing of the window,
an active bevel gear fixed to at least one of the first and second rotatable shafts, and
a pinion bevel gear rotatably mounted on the bevel gear housing and engaging the active bevel gear,
wherein the pinion bevel gear is adapted to be manually driven to rotate the active bevel gear and drive the at least one of the first and second rotatable shafts fixed thereto, so as to move a corresponding one of the first and second window shades between its retracted position and its extended position.

* * * * *